US012602229B2

(12) United States Patent

Moudgill et al.

(10) Patent No.: US 12,602,229 B2

(45) Date of Patent: Apr. 14, 2026

(54) NEURAL NETWORK ACCELERATOR FOR OPERATING A CONSUMER PIPELINE STAGE USING A START FLAG SET BY A PRODUCER PIPELINE STAGE

(71) Applicant: Optimum Semiconductor Technologies Inc., Tarrytown, NY (US)

(72) Inventors: Mayan Moudgill, Chappaqua, NY (US); John Glossner, Nashua, NH (US)

(73) Assignee: Optimum Semiconductor Technologies Inc.

( * ) Notice: Subject to any disclaimer, the term of this patent is extended or adjusted under 35 U.S.C. 154(b) by 1269 days.

(21) Appl. No.: 17/351,408

(22) Filed: Jun. 18, 2021

(65) Prior Publication Data

US 2021/0319283 A1 Oct. 14, 2021

Related U.S. Application Data

(63) Continuation of application No. 16/769,171, filed as application No. PCT/US2018/063648 on Dec. 3, 2018, now Pat. No. 11,144,815.

(Continued)

(51) Int. Cl.
G06F 9/30 (2018.01)
G06F 9/38 (2018.01)
(Continued)

(52) U.S. Cl.
CPC ...... G06F 9/30101 (2013.01); G06F 9/30116 (2013.01); G06F 9/3869 (2013.01);
(Continued)

(58) Field of Classification Search
CPC ............ G06F 9/30043; G06F 9/30098; G06F 9/30101; G06F 9/34; G06F 9/345;
(Continued)

(56) References Cited

U.S. PATENT DOCUMENTS 5,682,491 A 10/1997 Pechanek et al.
5,742,786 A 4/1998 Gallup et al.
(Continued)

OTHER PUBLICATIONS

European Application No. 18885654.6, Extended Search Report mailed Aug. 6, 2021, 12 pages.

(Continued)

*Primary Examiner* — David J. Huisman

(74) *Attorney, Agent, or Firm* — Zhong Law, LLC

(57) ABSTRACT

A system includes a processor and an accelerator circuit including an input circuit block comprising an input processor to perform first tasks of a neural network application, a filter circuit block comprising a filter processor to perform second tasks of the neural network application, and a plurality of general-purpose filters communicatively coupled to the input circuit block and the filter circuit block, where the input circuit block and the filter circuit block form stages of an execution pipeline, a producer stage is to supply data values to a consumer stage, and operation of the consumer stage is on hold until a start flag stored in a first general-purpose register of the plurality of general-purpose registers is set by the producer stage.

16 Claims, 9 Drawing Sheets

Related U.S. Application Data

(60) Provisional application No. 62/594,106, filed on Dec. 4, 2017.

(51) Int. Cl.
*G06F 15/78* (2006.01)
*G06N 3/04* (2023.01)
*G06N 3/063* (2023.01)

(52) U.S. Cl.
CPC ............. *G06F 9/3889* (2013.01); *G06N 3/04* (2013.01); *G06N 3/063* (2013.01); *G06F 15/7867* (2013.01)

(58) Field of Classification Search
CPC .... G06F 9/3838; G06F 9/3877; G06F 9/3885; G06F 9/3869; G06F 9/3889; G06N 3/04; G06N 3/06; G06N 3/063
See application file for complete search history.

(56) References Cited

U.S. PATENT DOCUMENTS

| | | | | |
|---|---|---|---|---|
| 5,748,934 A | * | 5/1998 | Lesartre | G06F 9/3858 |
| | | | | 712/216 |
| 5,923,893 A | * | 7/1999 | Moyer | G06F 9/3861 |
| | | | | 712/E9.067 |
| 5,953,741 A | * | 9/1999 | Evoy | G06F 12/0875 |
| | | | | 712/E9.046 |
| 6,205,509 B1 | * | 3/2001 | Platko | G06F 9/30101 |
| | | | | 713/400 |
| 6,954,758 B1 | | 10/2005 | O'Flaherty | |
| 7,380,106 B1 | * | 5/2008 | Bilski | G06F 9/3004 |
| | | | | 712/225 |
| 9,111,587 B2 | | 8/2015 | Ware et al. | |
| 9,479,173 B1 | | 10/2016 | Xu et al. | |
| 10,248,675 B2 | | 4/2019 | Birdwell et al. | |
| 2003/0154347 A1 | | 8/2003 | Ma et al. | |
| 2010/0199070 A1 | | 8/2010 | Schmitt et al. | |
| 2015/0339130 A1 | | 11/2015 | Kruglick | |
| 2015/0347338 A1 | | 12/2015 | Shippy et al. | |
| 2016/0321542 A1 | | 11/2016 | Towal | |
| 2017/0010330 A1 | | 1/2017 | Götz et al. | |
| 2017/0011288 A1 | | 1/2017 | Brothers et al. | |
| 2017/0255872 A1 | | 9/2017 | Hamze et al. | |
| 2018/0150681 A1 | | 5/2018 | Wang et al. | |
| 2019/0057036 A1 | * | 2/2019 | Mathuriya | G06F 9/45508 |
| 2019/0114534 A1 | * | 4/2019 | Teng | G06N 3/04 |
| 2019/0205739 A1 | * | 7/2019 | Liu | G06F 17/16 |

OTHER PUBLICATIONS

International Application No. PCT/US2018/063648, International Search Report and Written Opinion mailed Feb. 19, 2019, 8 pages.

Kavitha et al., "Design of a low-power and high throughout error detection and correction circuit using the 4T EX-OR method.", In: Journal of Engineering Science and Technology, Aug. 2017 pp. 2010-2027.

* cited by examiner

400

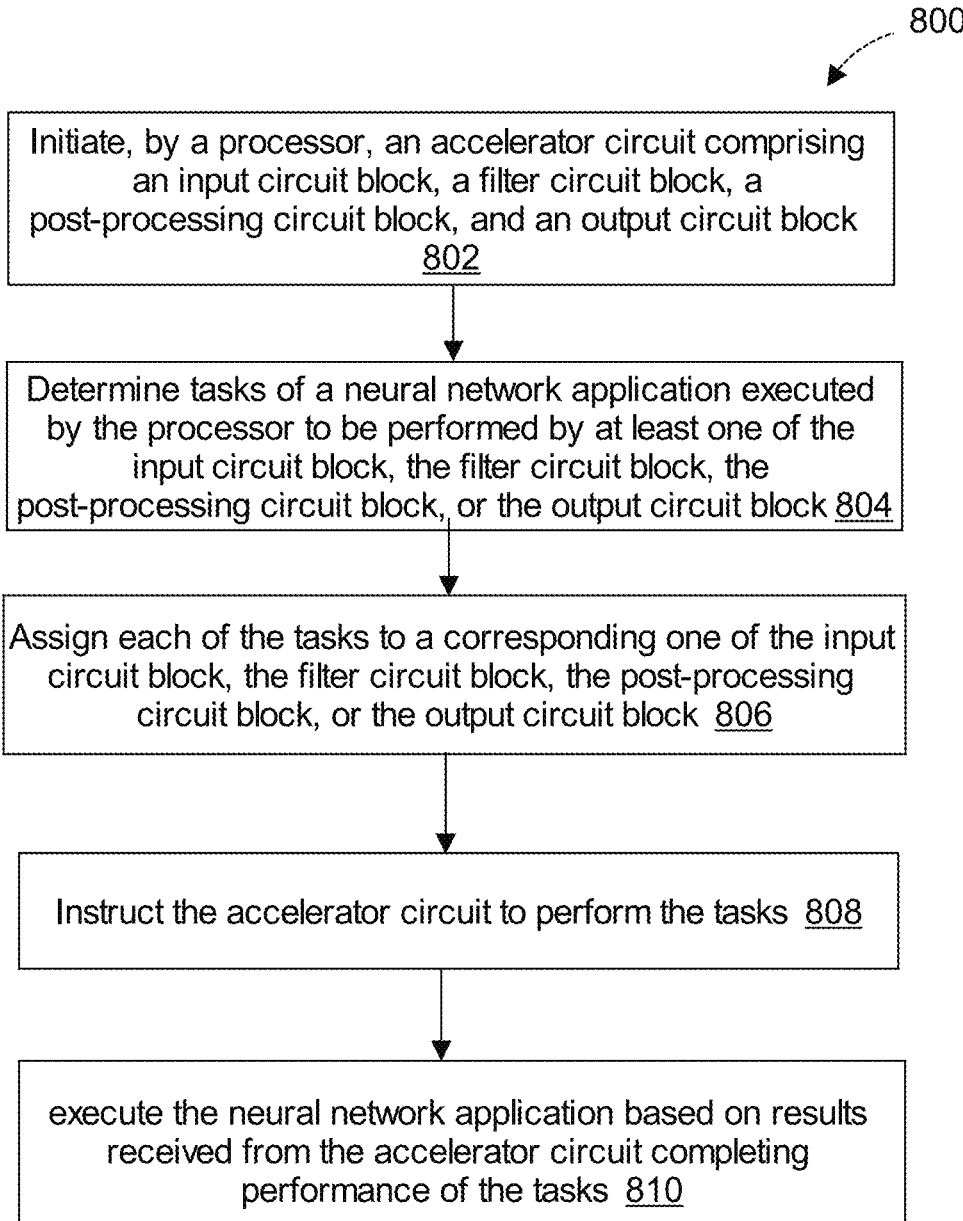

800

Initiate, by a processor, an accelerator circuit comprising an input circuit block, a filter circuit block, a post-processing circuit block, and an output circuit block
802

Determine tasks of a neural network application executed by the processor to be performed by at least one of the input circuit block, the filter circuit block, the post-processing circuit block, or the output circuit block 804

Assign each of the tasks to a corresponding one of the input circuit block, the filter circuit block, the post-processing circuit block, or the output circuit block 806

Instruct the accelerator circuit to perform the tasks 808 execute the neural network application based on results received from the accelerator circuit completing performance of the tasks 810

FIG. 8

NEURAL NETWORK ACCELERATOR FOR OPERATING A CONSUMER PIPELINE STAGE USING A START FLAG SET BY A PRODUCER PIPELINE STAGE

CROSS-REFERENCE TO RELATED APPLICATIONS

This application is a continuation of U.S. application Ser. No. 16/769,171 filed Jun. 2, 2020, which is a national stage application of PCT/US2018/063648 filed Dec. 3, 2018, which claims priority benefit to U.S. provisional application 62/594,106 filed Dec. 4, 2017. The contents of above-mentioned applications are hereby incorporated by reference in their entireties.

TECHNICAL FIELD

The present disclosure relates to hardware processors, and in particular, to hardware processors and associated system and architecture of a neural network accelerator circuit.

BACKGROUND

A processor is a hardware processing device (e.g., a central processing unit (CPU) or a graphic processing unit (GPU)) that implements an instruction set architecture (ISA) containing instructions operating on data elements. A vector processor (or array processor) may implement an ISA containing instructions operating on vectors of data elements. A vector is a one-directional array containing ordered scalar data elements. By operating on vectors containing multiple data elements, vector processors may achieve significant performance improvements over scalar processors that support only scalar instructions operating on singular data elements.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 8 depicts a flow diagram of a method to operate a GSNN accelerator circuit by a processor according to an implementation of the present disclosure.

DETAILED DESCRIPTION

Figure 1:
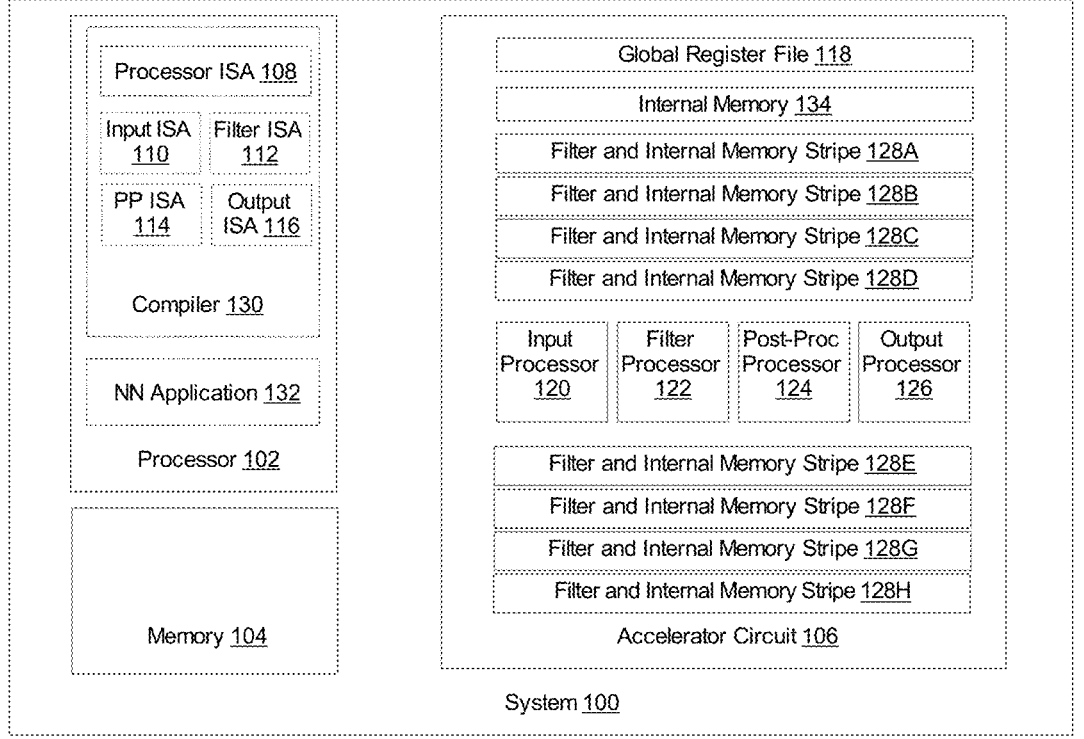
FIG. 1 illustrates a system including a general processor technologies simple neural network (GSNN) accelerator circuit according to an implementation of the disclosure.

Processors, in particular, vector processors may be employed to perform complex calculations such as, for example, the neural network applications. Neural networks are widely used in artificial intelligence (AI) applications. The neural networks in this disclosure are artificial neural networks which may be implemented on electrical circuits to make decisions based on input data. A neural network may include one or more layers of nodes. The layers can be any of an input layer, hidden layers, or an output layer.

The input layer may include nodes that are exposed to the input data, and the output layer may include nodes that are exposed to the output. The input layer and the output layer are visible layers because they can be observed from outside the neural network. The layers between the input layer and the output layer are referred to as hidden layers. The hidden layers may include nodes implemented in hardware to perform calculations propagated from the input layer to the output layer. The calculations may be carried out using a common set of pre-determined functions such as, for example, filter functions and activation functions. The filter functions may include multiplication operations and summation (also referred to as reduction) operations. The activation function can be any one of an all-pass function, a rectangular function (rect), a sigmoid function (sig), or a hyperbolic tangent function (tanh).

Different kinds of neural networks may be formed using different combinations of filter functions and activation functions. As new neural network architectures are being developed for different applications, there is a need for a flexible neural network architecture that can be used to implement these different kinds of neural networks to meet the demands of different applications.

Implementations of the present disclosure provide a technical solution that includes a flexible neural network architecture that can easily adapted to provide hardware implementations of different kinds of neural networks. A system according to an implementation may include a processor and an accelerator circuit communicatively coupled to the processor. The processor can be a hardware processing device (e.g., a central processing unit (CPU) or a graphic processing unit (GPU)) that implements an instruction set architecture (ISA) containing instructions operating on data elements. In some implementations, the processor can be a vector processor implementing an ISA containing instructions operating on vectors of data elements.

The processor is typically a general-purpose processing device. Although the processor may be programmed to execute a neural network application, the design of the processor does not provide the most efficient architecture to carry out the calculations in the hidden layers of a neural network. To improve the speed and efficiency of neural network calculations, implementations of the disclosure include an accelerator circuit communicatively coupled to the processor to provide computation support to the processor. The accelerator circuit works collaboratively with the processor to achieve high speed and high efficiency neural network implementations.

In one implementation, the accelerator circuit is a general processor technologies simple neural network (GSNN) accelerator circuit. The GSNN accelerator circuit may include a hardware circuit for accelerating the calculations of a neural network. At the top level, the GSNN accelerator circuit is a heterogenous computing system that may include multiple programmable circuit blocks that may run concurrently in parallel, where each circuit block may be designated to perform a specific kind of tasks (e.g., input, filter, post-processing, and output etc.). The circuit blocks may share an internal memory, where each circuit block may read data from and write data to the internal memory. Thus, circuit blocks may pass parameter data using the internal memory.

Each circuit block of the accelerator circuit may include its own fully-programable processing processor to control the operations. In another implementation, two or more (but fewer than all) circuit blocks may share a common fully-programmable processing processor to control the operations of the two or more circuit blocks. In another implementation, one circuit block may include more than one fully-programmable processing processors that work cooperatively to control the operation of the circuit block.

In one implementation, the processing processor can be a reduced instruction set computer (RISC) processor with a circuit implementation to generate control signals for its circuit block and for coordinating with processing processors of other circuit blocks. Each of the RISC processor is a hardware processor that may execute a common set of instructions specified according to a common instruction architecture set (ISA). Further, each of the RISC processor may execute instructions specified according to their respective ISAs for perform tasks specifically assigned to each RISC processor. The GSNN accelerator circuit may further include a general-purpose register file including general-purpose registers. The processor may implement instructions that use the general-purpose register file to coordinate operations between processing processors in different circuit blocks. For example, the special instructions may set up the pipeline operations from a first layer of nodes (the producer) to a second layer of node (the consumer) in the neural network.

In one implementation, a circuit block (referred to as a filter circuit block) may implement filter functions. The filter circuit block may be organized into multiple replicated circuit stripes to achieve scalability—i.e., adaptation to different kinds of neural network calculation without changing the filter processing processor on the filter circuit block. Each circuit stripe may include filter circuits and a slice of the internal memory dedicated to these filter circuits. Further, the filter circuit block may include a local register file including local registers that, in combination with the memory load fan-out mechanism (i.e., one output from a producer to feed to a maximum number of inputs of a consumer), support efficient execution and data reuse in 1D, 2D, and 2D with skip filter functions.

In one implementation, another separate circuit block (referred to as a post-processing circuit block) may implement the activation function. The post-processing circuit block may run in parallel concurrently with the filter circuit block. Besides the activation functions, the post-processing circuit block may also provide implementations of decimation functions and/or top-N functions. In another implementation, the post-processing circuit block is an integral part of the filter circuit block sharing a common RISC processor, rather than two separate circuit blocks.

In this way, the GSNN accelerator circuit may provide a flexible architecture to support efficient execution of different kinds of neural networks by the processor. The flexibility of the GSNN architecture allows for accommodation of different kinds of neural networks with high efficiency but without the need for hardware modifications.

FIG. 1 illustrates a system 100 including a GSNN accelerator circuit according to an implementation of the disclosure. As shown in FIG. 1, system 100 may include a processor 102, an accelerator circuit 106, and a memory device 104. System 100 can be a computing system or a system-on-a-chip (SoC). Processor 102 can be a hardware processor such as a central processing unit (CPU), a graphic processing unit (GPU), or any suitable types of processing device. Processor 100 may include an instruction execution pipeline (not shown), a register file (not shown), and circuits implementing instructions specified according to an instruction set architecture (ISA) 108. The instructions may be broken up into micro-operations (micro-ops) processed by the instruction execution pipeline.

In one implementation, processor 100 can be a vector processor that includes a vector instruction execution pipeline (not shown), a vector register file (not shown), and circuits implementing vector instructions specified according to a vector instruction set architecture (ISA). The vector instructions may operate on vectors containing a certain number of data elements. In one implementation, the vector instructions can be a variable-length vector instruction where the number of operations applied to a vector may be explicitly specified by the instruction (rather than pre-set). The number of operations can be specified directly as an immediate value of the variable-length vector instruction, or alternatively, indirectly using a register storing the length value. Thus, the number of operations may be dynamically changed during the execution of the variable-length vector instruction, which allows the number of operations specified by the vector instruction to be smaller (or greater) than the length of the vector. The length of a vector is defined as the maximum number of data elements that the vector can hold. For concise description, the disclosure will refer both a scaler and vector processor as a processor herein. Thus, a processor can be understood as a scaler processor or a vector processor unless otherwise explicitly specified.

Memory device 104 may include a storage device communicatively coupled to processor 102 and accelerator circuit 106. In one implementation, memory device 104 may store input data 112 to a neural network application and output data 114 generated by the neural network application. The input data 112 can be feature values extracted from application data such as, for example, image data, speech data etc., and the output data can be decisions made by the neural network, where the decisions may include classification of objects in images into different classes, identification of objects in images, or recognition of phrases in speech.

Accelerator circuit 106 may be communicatively coupled to processor 102 and memory 104 to perform the computationally-intensive tasks using the special-purpose circuits therein. Accelerator circuit 106 may perform these tasks on behalf of processor 102. For example, processor 102 may be programmed to break down a neural network application into multiple (hundreds or thousands) calculation tasks and delegate the performance of these tasks to accelerator circuit 106. After the completion of these tasks by accelerator circuit 106, processor 102 may receive the calculated results in return. The accelerator circuit 106 can be an application specific integrated circuit (ASIC), a field programmable gate array (FPGA), a digital signal processor (DSP), network processor, or the like.

In one implementation, as shown in FIG. 1, accelerator circuit 106 may be implemented as a GSNN accelerator circuit that may include a global register file 118, an input circuit block including an input processor 120, a filter circuit block including a filter processor 122, a post-processing circuit block including a post-processing processor 124, and an output circuit block including an output processor 126.

Further, accelerator circuit 106 may include an internal memory 134 and filter circuits organized as circuit stripes 128A-128H. In one specific implementation, the internal memory 134 can be 2 MB multi-banked memory device.

In one implementation, each of the input processor 120, the filter processor 122, the post-processing processor 124, and the output processor 126 can be a reduced instruction set computer (RISC) processor with a circuit implementation to generate control signals that control a corresponding circuit block. Thus, the input processor 120 may control operations of an input circuit block; the filter processor 122 may control operations of a filter circuit block; the post-processing processor 124 may control operations of a post-processing circuit block; the output processor 126 may control operations of an output circuit block.

In one implementation, the filter circuit block may include filter processor 122, a portion of the internal memory 134, and filter circuits implementing 1D, 2D, and 2D with skip filter functions. The internal memory 134 can be a memory on accelerator circuit 106 that is shared by the input processor 120, the filter processor 122, the post-processing processor 124, and the output processor 126. The portion of internal memory 134 and filter circuits of the filter circuit block may be organized accordingly as circuit stripes 128A-128H. Each circuit stripe 128A-128H may contain a certain number of filter circuits and a corresponding slice of internal memory dedicated to the filter circuit on the circuit stripe. Filter processor 122 may control the operations of the circuit stripes 128A-128H.

In one implementation, accelerator circuit 106 may include eight (8) circuit stripes 128A-128H, where each circuit stripe may include identical circuit components, thus achieving a scalable construction of the filter circuit block. The number of circuit stripes may be more than or fewer than eight (8). The number eight (8), however, may provide a balance with the available input/output bandwidth. Further, the filter circuit block may include a register structure that, in combination with the memory load fan-out mechanism (i.e., one output from a producer to feed to a maximum number of inputs of a consumer), supports efficient execution and data reuse in 1D, 2D, and 2D with skip filter functions.

Accelerator circuit 106 may also include an input circuit block (not shown in FIG. 1), a post-processing circuit block (not shown in FIG. 1), and an output circuit block (not shown in FIG. 1) that may run in parallel with the filter circuit block. Specifically, the post-processing circuit block may include circuits that implement at least one of an activation function, a decimation function, or a top-N function (for a programmable N, where N is an integer value greater than one). The input circuit block may include input processor 120 to control the copying of data from memory 104 to the internal memory 134 of accelerator circuit 106. Conversely, the output circuit block may include output processor 126 to control the copying of data from the internal memory 134 of accelerator circuit 106 to memory 104. In contrast, the filter circuit block and the post-processing circuit block may read their inputs from the internal memory and write their output to the internal memory, thus achieving insolation from the external memory 104.

In operation, processor 102 may be assigned to perform the calculation of a neural network application 132. Neural network application 132 can be a program including the source code written in a programming language such as, for example, Java, C++, Python, etc. Neural network application 132 can be a training program that determines the proper weight parameters for the neural network or a decision program that makes decisions (e.g., object recognition and detection) based on the trained neural network. To speed up the execution of the program, a programmer may optionally provide mark-ups to certain portions of source code of the program to be executed by accelerator circuit 106.

Processor 102 may further execute a compiler 130 to convert the source code of neural network application 132 into a sequence of machine executable instructions that are specified according to one or more instruction set architectures (ISAs). The classification of machine executable instructions may be based on the mark-ups provided by the programmer or based on an analysis of the source code by the compiler 132. The mark-ups may include a begin identifier for a task assigned to a circuit block (e.g., the filter circuit block) and an end identifier the task. In one implementation, these machine executable instructions may include a first class of instructions specified according to a processor ISA 108 to be executed by the execution pipeline of processor 102. Further, these machine executable instructions may include a second class of instructions specified according to an input ISA 110 to be executed by input processor 120; a third class of instructions specified according to filter ISA 112 to be executed by filter processor 122; a forth class of instructions specified according to a post-processing ISA 114 to be executed by post-processing processor 124; a fifth class of instructions specified according to an output ISA 116.

Processor 102 may execute the first class of instructions to load data useful for the neural network application into memory 104. The data can be the input data for the application and/or coefficient data for the neural network application 132. Processor 102 may also execute the first class of instructions to load accelerator circuit 106 with data in data memories and instructions of second, third, fourth, and fifth class in instruction memories to be executed by input processor 120, filter processor 122, post-processing processor 124, and output processor 126. Processor 102 may also initialize global registers in global register file 118 (and their associated shadow registers) with initial values needed to complete tasks performed by input processor 120, filter processor 122, post-processing processor 124, and output processor 126.

Responsive to receiving the second class of instructions in the instruction memory, input processor 120 may execute the second class of instructions to perform input operations such as, for example, copying data from memory 104 to the internal memory 134 of accelerator circuit 106. Responsive to receiving the third class of instructions in the instruction memory, filter processor 122 may execute the third class of instructions to perform filter operations using the filter circuits in circuit stripes 128A-128H. Filter processor 122 may read input data and parameters from the internal memory set up by input processor 120 and write results to the internal memory. Responsive to receiving the fourth class of instructions in the instruction memory, post-processing processor 124 may execute the fourth class of instructions to perform post-processing operations such as an activation function, a decimation function, or a top-N function. Post-processing processor 124 may read input data and parameters from the internal memory set up by filter processor 122 and write results to the internal memory. Responsive to receiving the fifth class of instructions, output processor 125 may copy result data from internal memory to memory 104.

Detailed descriptions of the filter circuit block, the post-processing circuit block, the input circuit block, and the output circuit block are provided in the following.

The central operation of a neural network is the filter operation. The filter circuit block may include a filter circuit implementing a multiplication and reduction operation, or $$y = \sum_{j=0}^{N} a_j * x_j$$

in hardware circuit, where $a_j$, j=1, . . . , N are the weight values and $x_j$, j=1, . . . , N are the input values. The reduction operator is a linear operator; in particular, a filter of size N=k*M can be implemented by using k filters of size M and then summing the results together, where k and M are integer values.

Figure 2:
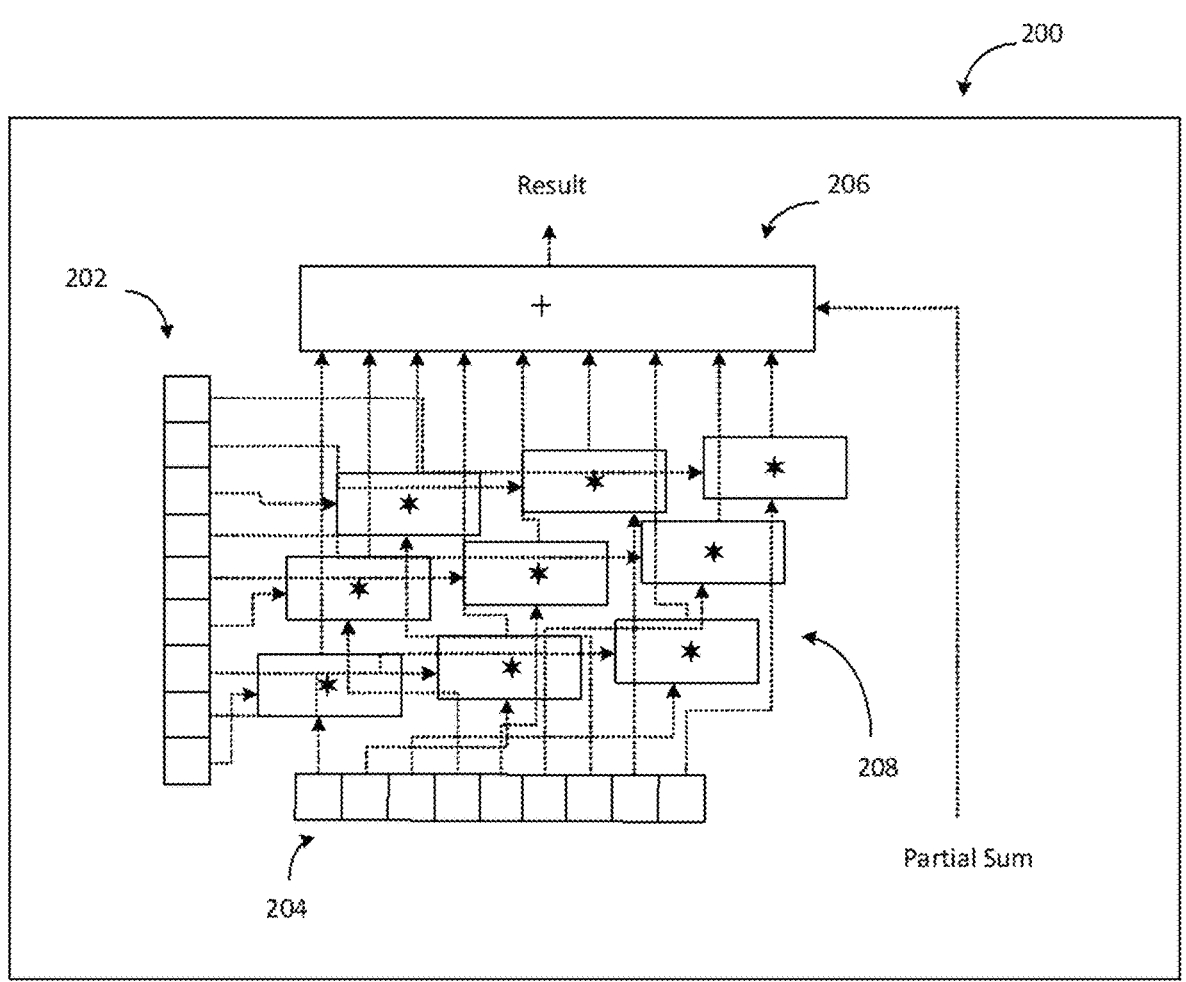
FIG. 2 illustrates a 3×3 filter according to an implementation of the disclosure.

In one implementation, the GSNN accelerator circuit 106 as shown in FIG. 1 may include filter circuits containing implementations of filters with a size of a predetermined number (e.g. 9=3×3) entries. FIG. 2 illustrates a 3×3 filter 200 according to an implementation of the disclosure. As shown in FIG. 2, filter 200 may include two registers 202, 204 that hold data values that can be weight values and input values to be filtered. The data values can be represented by 9 half-precision (16-bit) floating point numbers, connected to 9 multipliers to form a reduce tree 208. To allow the implementation of larger filters, filter 200 may include sum circuit 206 to add the results of the reduction operators (multiplications) with a partial sum from another filter. The intermediate values generated by the reduce tree may use a representation other than half-precision 16 bit to increase the accuracy of the result. The final result is converted back to 16-bit half-precision.

Figure 3:
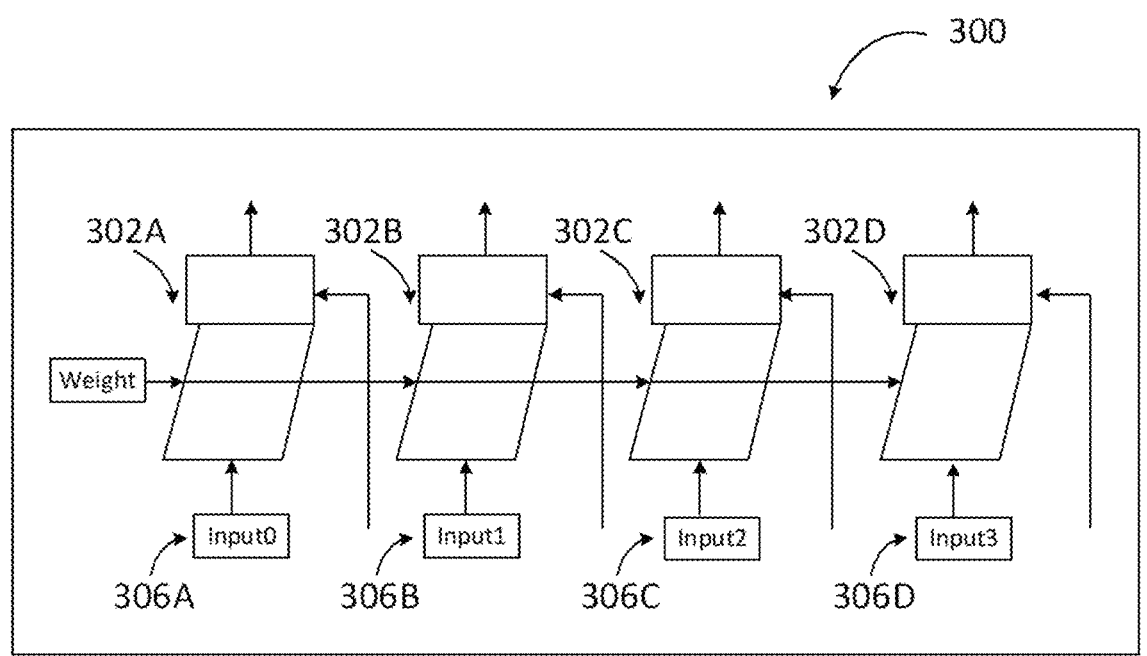
FIG. 3 illustrates a group of filters according to an implementation of the disclosure.

To improve the performance, implementations of the disclosure may provide groups of filters that incorporate multiple filters in parallel. FIG. 3 illustrates a group of filters 300 according to an implementation of the disclosure. As shown in FIG. 3, the group may include, four filters (as an example) 302A-302D implemented in parallel. In the case of neural network calculation, it is possible for all of the filters 302A-302D to share one of the two input registers. In the GSNN, filter 304 storing the weight values may be shared by all filters 302A-302D, while input registers 306A-306D may store the input values to each individual filter 302A-302D.

The filter processor 122 may execute an input instruction to copy the input values from the internal memory to the input registers 306A-306D. The input instruction may be in different copying modes such as, for example, copying three, six or nine half precision values per instruction. For example, wt9 (weight 9 direct) mode may indicate to copy nine half-words from internal memory to nine elements in the weight register. The wt3 (weight 3 shift) mode may indicate to copy three half-words from the internal memory and shift the three half-words into the weight register. The wt3 mode is used when the program is assembling 9 values by reading a 3×3 array from inside a bigger 2D array. In that case the program uses a sequence of 3 wt3 reads to get the 9 values, reading 3 values from a row each time.

The in9 (input 9 shift) mode may indicate that the contents of the lowest three input registers of the group of four filters are shifted upwards, and 9 half-words are read from memory into the first input register. To load all four input registers, four in9 operations may be used in sequence.

Implementations may include an alternate approach for specifying the input register that should be written. For example, the instruction could have specified that the nine half-words that should have been written to one of registers 0 through 3. Implementations may choose the shift approach instead because it is simpler to encode and allows for more parallel filters. For example, if eight parallel filters are used, the shift implementation would perform eight in9 operations to load all eight input registers, while the other approach would require modifying the encoding to specify register 0 through 7 (instead of register 0 through 3).

The in6 (input 6 replicate) mode may indicate that 6 half-words are copied from the internal memory to the input register. The contents of each of the input registers are shifted by 3, similar to wt3, and 3 half-words are shifted in.

The in9×2 (input 9 replicate with stride 2) mode may indicate that 9 half-words are copied from the internal memory to the input registers. The contents of each of the input registers are shifted by 3, similar to wt3, and 3 half-words are shifted in. This mode supports a data reuse pattern found in convolutional neural network (CNN) using filters of size 3×3 with stride 2.

Figure 4:
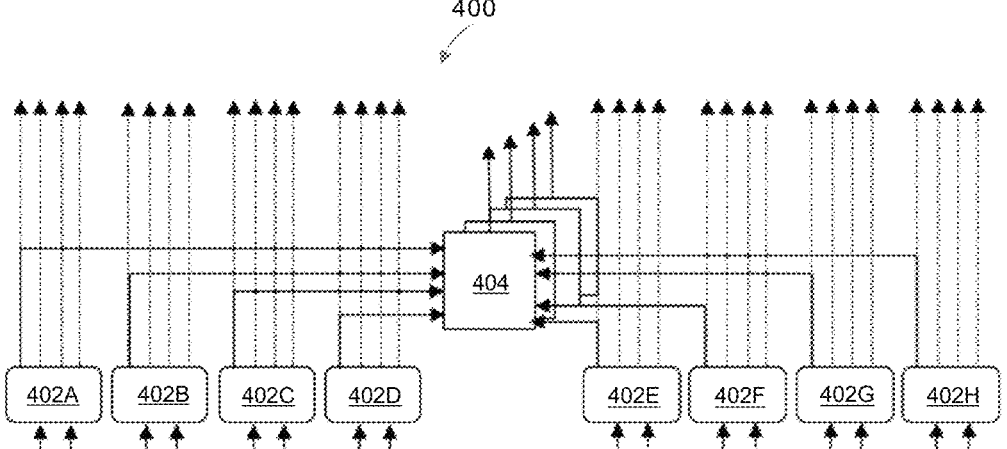
FIG. 4 illustrates a combination of eight circuit stripes according to an implementation.

In one implementation, the circuit stripes on an accelerator circuit may include four filter circuits that may be combined together. FIG. 4 illustrates a combination 400 of eight circuit stripes according to an implementation. As shown in FIG. 4, each circuit stripe 402A-402H may contain a respective group of four filters. Each filter group produces four results. These results can be written back to internal memory 134, for a total of 32 half-word writes. Alternatively, each of the four results can be summed together using a sum circuit 404 across the eight circuit stripes, for a total of four half-word results that are written to internal memory 134.

The filter circuit block may also support zero-padding. Zero-padding can be accomplished by zero-ing out (under the control of a zero mask) any of the 3/6/9 input values. It is possible to disable (under the control of a filter mask) the filters for a particular circuit stripe. If the filter is disabled, it will not read or write any value. If combining is being done, then all filter outputs for disabled slices will be treated as zero.

In one implementation, the GSNN accelerator circuit 106 as shown in FIG. 1 may include a post-processing circuit block containing implementations of post-processing functions needed by a neural network engine. The post-processing function may include decimation/pooling, activation, and sort/top-N functions. These functions all involve reading 4/6/8 half-words from the internal memory 134, performing the post-processing function, and either updating internal state of registers or writing 2/4 half-words to internal memory 134.

The post-processing function can include a compact function (i.e., decimation/max-pooling). This operation of the compact function is to compact the input data of N elements to one element. One to four half-words may be compacted to 1 half-word. To improve performance, multiple compactions can be carried out in parallel. The four possibilities are:
4→1:8 half-words are read at input and 2 half-words are output
3→1:6 half-words are read at input and 2 half-words are output
2→1:8 half-words are read at input and 4 half-words are output
1→1:4 half-words are read at input and 4 half-words are output During the compaction operation, either the first value of the group is chosen or the maximum of all elements in the group are chosen. Choosing the first value is used for decimation, and choosing the maximum is used for max-pooling.

The 2/4 compacted results can optionally be further compared in parallel with 2/4 values held in a local register of the post-processing circuit block; the maximums of these values are provided to the output.

The output can either be written back to the internal registers or sent to the activation stage for further processing.

This multi-stage approach can be used to implement a max-pooling function. For instance, to implement 2×2 max-pooling:

> do a 2→1 compaction using 8 elements from row N with maximum, saving the results by writing to the internal register;
>
> do a 2→1 compaction using 8 elements from row N+1 with maximum, comparing against saved results, and then output the 4 results These two operations perform 4 2×2 max-pool operations in parallel using 2 operations.

The post-processing function can include an activation function. The 2/4 outputs from the decimation stage are further processed. There are 4 possible options:

> none (no action identity function): the input value is passed through unchanged or $$y_i = x_i$$

> rect: a step function that converts negative values to 0 and pass other values through without changes $$y_i = \begin{cases} 0, & x_i < 0 \\ x_i, & x_i \geq 0 \end{cases}$$

sig: a sigmoid function that calculates a results as follows:

$$y_i = \frac{1}{1 + e^{-x_i}}$$

> tanh: a hyperbolic tangent function that calculates as follows:

$$y_i = \tanh x_i$$

The post-processing function can include a top-N function. The logic circuit implementing the top-N function is optimized to find the largest N values in an array, and the corresponding positions of the largest N values in the array, wherein N is an integer value. The calculation to find the top N values may include iterations through all elements in the array N times. This logic circuit can be used to sort the entire array. If the array has a total of L elements, then finding top-L will result in a sorted list of the values in the array and their original positions.

To find the largest value in an array stored in the internal memory, the logic circuit may read four elements of the array at a time until the entire array has been read. For the first read, the largest value and its position is recorded. For subsequent reads, the maximum of the four elements is compared against the recorded maximum. If the maximum of the later read is larger, the value and its position is saved. After the last read, the largest value and the position is written out in the internal memory to store the last written position and value.

For subsequent searches, all values in the array that are larger than the last written value or are that the same as the last written value but whose position is earlier than or the same as the last written position are ignored. If N largest values have been found, this mechanism causes the search to ignore the previously found top N values, and search for the next largest value. After all elements have been processed, the next largest value and position are written to the internal memory and saved.

In one implementation, the GSNN accelerator circuit 106 as shown in FIG. 1 may include an input circuit block responsible for copying the data from external memory 104 to the internal memory 134. The values read from external memory 104 can be specified to be half-precision floating point, signed byte or unsigned byte. The input circuit block may convert the byte values into the corresponding half-precision floating point values, where signed bytes are treated as numbers between −128 and 127, and unsigned bytes are treated as numbers between 0 and 128. The input circuit block may read from memory 104 and write to a specific memory address of the internal memory. Alternatively, the input circuit block may broadcast to all circuit stripes 128A-128H to write each value with a same offset in each slice of internal memory 134 assigned to circuit stripes 128A-128H.

In one implementation, the GSNN accelerator circuit 106 as shown in FIG. 1 may include an output circuit block responsible for copying the data from the internal memory to external memory 104. The values that are read from the internal memory 134 can be written as-is, as half-precision floating point numbers, or can be converted to signed or unsigned byte numbers. If signed byte output is specified, the floating point numbers are converted to integers by discarding the fractional parts (i.e. round-to-zero). If the values are outside the range between −128 and 127, positive values are saturated to 127 and negative values are saturated to −128. Similarly, if unsigned byte output is specified, the floating point values are truncated, and values are saturated to 255 or 0.

Accelerator circuit 106 may include an internal memory 134 that is shared by the input circuit block, the filter circuit block, the post-processing circuit block, and the output circuit block, and accessible by input processor 120, filter processor 122, post-processing engine 124, and output processor 126. In one implementation, to allow for multiple parallel accesses and allow for accesses at arbitrary alignment, the internal memory 134 is implemented by partitioning the memory into multiple arrays. In the present implementation of GSNN accelerator circuit, 512×128 bits (=16 Bytes) form an array, and there are 256 arrays containing 8 KBytes that form an internal memory of a total of 2 MBytes.

Figure 5:
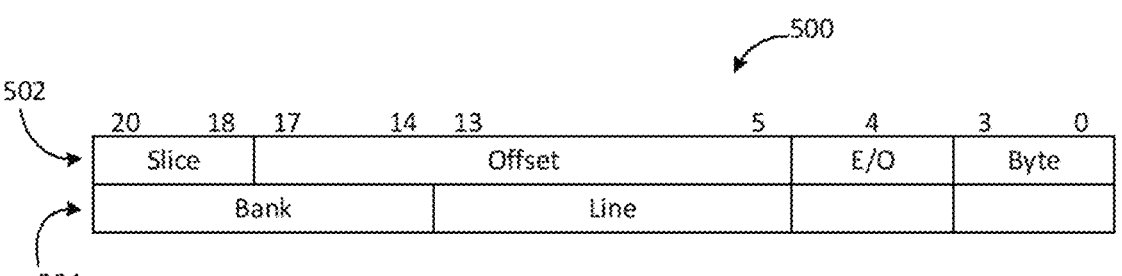
FIG. 5 illustrates two memory addressing schemes according to an implementation of the disclosure.

For addressing purposes, the arrays can be organized into even/odd pairs, where addresses (0 to 15) mod 32 may be read from an even array and address (16 to 31) mod 32 are read from an odd array. Each pair of the even/odd arrays may form a bank. Thus, the internal memory may include 16 banks, each bank including an even array and an odd array that each contains 512×126 bits. In one implementation, the arrays can be further grouped into memory slices, where each memory slice assigned to a corresponding circuit stripe may be associated with 256 KB of the internal memory. Thus, an address N mod 256*1024 belongs to slice N. In this way, an address can be specified as being at a particular offset with respect to a starting address of a slice. Alternatively, the address can be specified as belonging to a line in a bank of an even/odd array pair. FIG. 5 illustrates two memory addressing schemes 500 according to an implementation of the disclosure. As shown in FIG. 5, the internal memory may be addressed using a slice identifier and an offset using a first scheme 502. When accessing the internal memory using this scheme, an instruction may address a slice of the internal memory using the slice identifier and a particular position using the offset with respect to a start position of the slice.

Alternatively, the internal memory may be addressed using memory banks and lines as shown using a second scheme 504. In one implementation, all addresses may be aligned to half-word boundaries. This means that bit 0 of the address should be aligned at position 0. The even/odd pair arrangement of memory banks allows up to nine half-words to be read starting at any 2 Byte boundary. For example, to write 4 Bytes of data starting at internal address 0x10E, filter processor 122 or post-processing processor 124 may write 2 Bytes to the end of line 8 of even array of bank 0 and write 2 Bytes to the beginning of line 8 of odd array of bank 0. Similarly, to read 18 Bytes of data starting at address 0x13ff0, filter processor 122 or post-processing processor 124 may read the 16 Bytes from last line of the odd array of bank 4 and 2 Bytes from the first line of the even array of the next bank (i.e. 5). While it is possible to fetch values from even/odd arrays belonging to different banks, it is not allowed if the banks belong to different slices. So, it is not possible to read from the end of bank 15 and the beginning of bank 16 in the same access because bank 15 and bank 16 belong to different slices.

A memory read or write can either be a global access or per slice access. In a global access, an address refers to a range of memory location in the internal memory 134. That contiguous range is read or written. In a per slice access, an address refers to the simultaneous access to contiguous ranges of the internal memory 134, one per slice. The offset in the address can be used to identify a memory range for each slice, and that offset is read/written in each slice.

The access from the various blocks can be global or per slice in different situation summarized in the following:

filter data read is a per slice operation;
filter partial sum read is a global operation if running in combining mode otherwise it is a per slice operation;
filter result write is a global operation if running in combining mode otherwise it is a per slice operation;
post read is a global operation;
post write is a global operation;
input write is a per slice operation if broadcast, otherwise it is a global operation; and
output write is a global operation.

Figure 6:
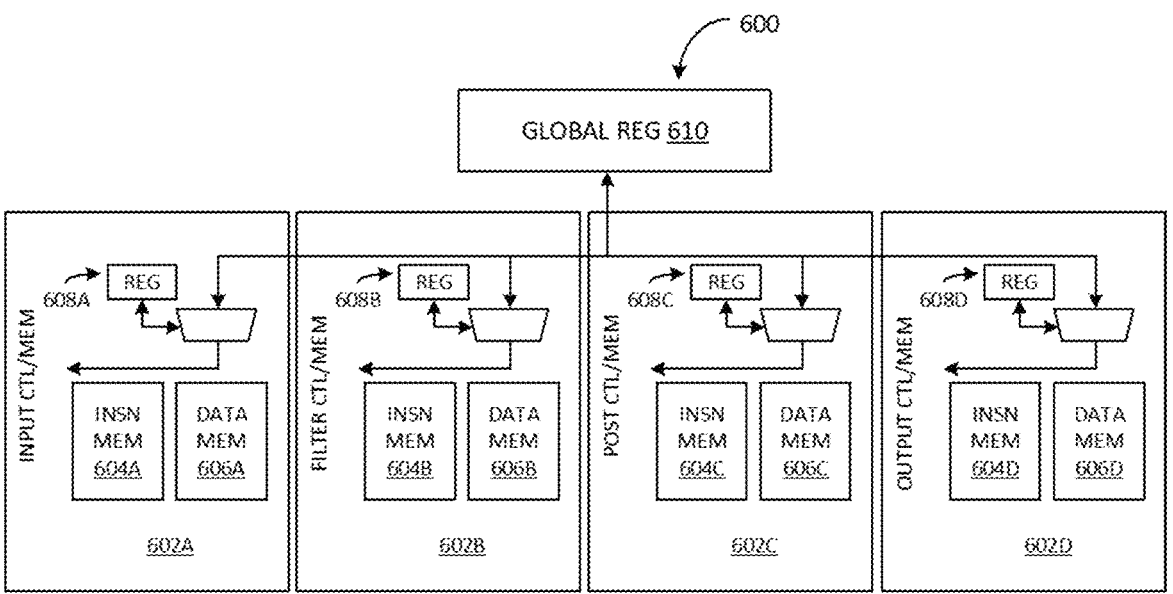
FIG. 6 illustrates an accelerator circuit according to an implementation of the disclosure.

Each of the input circuit block, the filter circuit block, the post-processing circuit block, and the output circuit block may include a processor to control the operations of a respective circuit block. Each processor can be a simple 32-bit Harvard architecture RISC processor. The four processors may each include their own registers, instruction memory and data memory, and run concurrently with each other. There are also a set of shared global registers. FIG. 6 illustrates an accelerator circuit 600 according to an implementation of the disclosure. As shown in FIG. 6, accelerator circuit 600 may include an input processor 602A, a filter processor 602B, a post-processing processor 602C, and an output processor 602D. Each of input processor 602A, filter processor 602B, post-processing processor 602C, and output processor 602D may each include a respective instruction memory 604A-604D, a data memory 606A-606D, and a local register 608A-608D. Input processor 602A, filter processor 602B, post-processing processor 602C, and output processor 602D may share a global register 610. These processors may generate control signals and memory read/write addresses for their respective circuit block and may coordinate the actions of the processors using shared states.

In one implementation, each processors may have the following state:

a 32 bit program counter (PC) to store the address of the next instruction to be executed;

16 32 bit local registers, $r0 . . . $r15;

16 shared 32 bit global registers, $g0 . . . $g15;

16 KB of word (32 bit) addressed data memory; and

16 KB of word (32 bit) addressed instruction memory.

As shown in FIG. 1, input processor 602A, filter processor 602B, post-processing processor 602C, and output processor 602D may each execute instructions specified according to their respective ISA 110, 112, 114, 116. According to the ISA, the register field may store a 5-bit identifier, allowing for identification of 32 registers. Values 0-15 represent register $r0-$r15, while value 16-31 may represent global register $g0-$g15. All immediate addresses (for branches and memory operations) are absolute addresses rather than program counter (PC) relative. Further, addresses are 32 bit (word) quantities. Both instructions in the instruction memory 604A-604D and data stored in data memory 606A-606D are 32 bit words. It should be noted that the local instruction and data memory particular to a processor is distinct from the internal memory which is used to feed the respective circuit blocks.

Each engine may be associated with special instructions for generating controls for the block it controls. These instructions may be in the formats as specified in Table 1.

TABLE 1

| Type | Opcode | RT | RA | RB/IMM | |
|---|---|---|---|---|---|
| | 31 | 25 | 20 | 15 | 10 |
| | 26 | 21 | 16 | 11 | 0 |
| unary | opcode | rt | | rb | |
| unary_imm | opcode | rt | | imm16 | |
| binary | opcode | rt | ra | rb | |
| binary_imm | opcode | rt | ra | imm | |
| jump | opcode | cc | ra | rb | |
| jump_abs | opcode | cc | ra | imm | |
| wait | opcode | cc | ra | | |
| call | opcode | rt | | rb | |
| call_abs | opcode | rt | | | |
| load | opcode | rt | | rb | soff |
| load_abs | opcode | rt | | imm | |
| store | opcode | | ra | rb | soff |
| store_abs | opcode | | ra | imm | |
| special | opcode | lp | | rb | |
| special_imm | opcode | lp | | imm | |

Table 1

The input processor may execute the following instructions specified according to input ISA 110:

Copy copy $rt,$rb (bit arrangements shown in Table 2)

TABLE 2

| 31 | 26 | 25 | 21 | 20 | 16 | 15 | 11 | 10 | 0 |
|---|---|---|---|---|---|---|---|---|---|
| 0x00 | | RT | | | | RB | | | |

RT ← RB.

The general-purpose register RT is set to the value in RB.
Copy Immediate
  copyi $rt,imm (bit arrangements shown in Table 3)

TABLE 3

| 31 | 26 | 25 | 21 | 20 | 16 | 15 | 0 |
|---|---|---|---|---|---|---|---|
| 0x01 | | RT | | | | IMM | |

RT ← IMM

The general-purpose register RT is set to the zero extended 16 bit value in the IMM field
Copy Upper
  copy $rt,$rb (bit arrangements shown in Table 4)

TABLE 4

| 31 | 26 | 25 | 21 | 20 | 16 | 15 | 11 | 10 | 0 |
|---|---|---|---|---|---|---|---|---|---|
| 0x02 | | RT | | | | RB | | | |

RT ← $RB_{15 \ldots 0} << 16$

The general-purpose register RT is set to the value in RB shifted left by 16 positions.
Copy Upper Immediate
  copyui $rt,imm (bit arrangements shown in Table 5)

TABLE 5

| 31 | 26 | 25 | 21 | 20 | 16 | 15 | 0 |
|---|---|---|---|---|---|---|---|
| 0x03 | | RT | | | | IMM | |

RT ← IMM << 16

The general-purpose register RT is set to the 16 bit value in the IMM field shifted left by 16.
Add
  add $rt,$ra,$rb (bit arrangements shown in Table 6)

TABLE 6

| 31 | 26 | 25 | 21 | 20 | 16 | 15 | 11 | 10 | 0 |
|---|---|---|---|---|---|---|---|---|---|
| 0x04 | | RT | | RA | | RB | | | |

RT ← RA + RB

The general-purpose register RT is set to the sum of the values in RA and RB.
Add Immediate
  addi $rt,$ra,imm (bit arrangements shown in Table 7)

TABLE 7

| 31 | 26 | 25 | 21 | 20 | 16 | 15 | 0 |
|---|---|---|---|---|---|---|---|
| 0x05 | | RT | | RA | | IMM | |

RT ← RA + IMM

The general-purpose register RT is set to the sum of value in RA and the zero extended 16 bit value in the IMM field.
Subtract
  sub $rt,$ra,$rb (bit arrangements shown in Table 8)

TABLE 8

| 31 | 26 | 25 | 21 | 20 | 16 | 15 | 11 | 10 | 0 |
|---|---|---|---|---|---|---|---|---|---|
| 0x06 | | RT | | RA | | RB | | | |

RT ← RA-RB

The general-purpose register RT is set to the difference between the value in RA and the value in RB.

Subtract Immediate
  subi $rt,$ra,imm (bit arrangements shown in Table 9)

TABLE 9

| 31 | 26 | 25 | 21 | 20 | 16 | 15 | 0 |
|---|---|---|---|---|---|---|---|
| 0x07 | | RT | | RA | | IMM | |

RT ← RA-IMM

The general-purpose register RT is set to the difference between the value in RA and the zero extended 16 bit value in the IMM field.
Shift Right
  shr $rt,$ra,$rb (bit arrangements shown in Table 10)

TABLE 10

| 31 | 26 | 25 | 21 | 20 | 16 | 15 | 11 | 10 | 0 |
|---|---|---|---|---|---|---|---|---|---|
| 0x08 | | RT | | RA | | RB | | | |

RT ← $RA >> RB_{4 \ldots 0}$

The general-purpose register RT is set to the value in RA shifted right by the value in RB mod 32, with zeroes shifted in.
Shift Right Immediate
  shri $rt,$ra,imm (bit arrangements shown in Table 11)

TABLE 11

| 31 | 26 | 25 | 21 | 20 | 16 | 15 | 0 |
|---|---|---|---|---|---|---|---|
| 0x09 | | RT | | RA | | IMM | |

RT ← $RA >> IMM_{4 \ldots 0}$

The general-purpose register RT is set to the value in RA shifted right by lower 5 bits of the IMM field, with zeroes shifted in.
Shift Right Arithmetic
  shrq $rt,$ra,$rb (bit arrangements shown in Table 12)

TABLE 12

| 31 | 26 | 25 | 21 | 20 | 16 | 15 | 11 | 10 | 0 |
|---|---|---|---|---|---|---|---|---|---|
| 0x0A | | RT | | RA | | RB | | | |

RT ← $RA >>_a RB_{4 \ldots 0}$

The general-purpose register RT is set to the value in RA shifted right by the value in RB mod 32, with the sign of RA shifted in.
Shift Right Immediate
  shrai $rt,$ra,imm (bit arrangements shown in Table 13)

TABLE 13

| 31 | 26 | 25 | 21 | 20 | 16 | 15 | 0 |
|---|---|---|---|---|---|---|---|
| 0x0B | | RT | | RA | | IMM | |

RT ← $RA >>_a IMM_{4 \ldots 0}$

The general-purpose register RT is set to the value in RA shifted right by lower 5 bits of the IMM field, with the sign of RA shifted in.
Shift Left
  shl $rt,$ra,$rb (bit arrangements shown in Table 14)

TABLE 14

| 31 | 26 | 25 | 21 | 20 | 16 | 15 | 11 | 10 | 0 |
|---|---|---|---|---|---|---|---|---|---|
| 0x0C | | RT | | RA | | RB | | | |

RT ← $RA << RB_{4 \ldots 0}$

The general-purpose register RT is set to the value in RA shifted left by the value in RB mod 32, with zeroes shifted in.

Shift Left Immediate shli $rt,$ra,imm (bit arrangements shown in Table 15)

TABLE 15

| 31    26 | 25    21 | 20    16 | 15    0 |
|----------|----------|----------|---------|
| 0x0D | RT | RA | IMM |

$RT \leftarrow RA \ll IMM_{4 \ldots 0}$

The general-purpose register RT is set to the value in RA shifted left by lower 5 bits of the IMM field, with zeroes shifted in.

Multiply mul $rt,$ra,$rb (bit arrangements shown in Table 16)

TABLE 16

| 31    26 | 25    21 | 20    16 | 15    11 | 10    0 |
|----------|----------|----------|----------|---------|
| 0x0E | RT | RA | RB | |

$RT \leftarrow RA*RB_{15 \ldots 0}$

The general-purpose register RT is set to the lower 32 bits of the product of the value in RA with the lower 16 bits of RB.

Multiply Immediate muli $rt,$ra,imm (bit arrangements shown in Table 17)

TABLE 17

| 31    26 | 25    21 | 20    16 | 15    0 |
|----------|----------|----------|---------|
| 0x0F | RT | RA | IMM |

$RT \leftarrow RA*IMM$

The general-purpose register RT is set to the lower 32 bits of the product of the value in RA with the IMM field.

Or or $rt,$ra,$rb (bit arrangements shown in Table 18)

TABLE 18

| 31    26 | 25    21 | 20    16 | 15    11 | 10    0 |
|----------|----------|----------|----------|---------|
| 0x10 | RT | RA | RB | |

$RT \leftarrow RA|RB$

The general-purpose register RT is set to the bit-wise OR of the values in RA and RB.

Or Immediate ori $rt,$ra,imm (bit arrangements shown in Table 19)

TABLE 19

| 31    26 | 25    21 | 20    16 | 15    0 |
|----------|----------|----------|---------|
| 0x11 | RT | RA | IMM |

$RT \leftarrow RA|IMM$

The general-purpose register RT is set to the bit-wise or of value in RA and the zero extended 16 bit value in the IMM field.

And and $rt,$ra,$rb (bit arrangements shown in Table 20)

TABLE 20

| 31    26 | 25    21 | 20    16 | 15    11 | 10    0 |
|----------|----------|----------|----------|---------|
| 0x12 | RT | RA | RB | |

$RT \leftarrow RA\&RB$

The general-purpose register RT is set to the bit-wise and of the values in RA and RB.

And Immediate andi $rt,$ra,imm (bit arrangements shown in Table 21)

TABLE 21

| 31    26 | 25    21 | 20    16 | 15    0 |
|----------|----------|----------|---------|
| 0x13 | RT | RA | IMM |

$RT \leftarrow RA\&IMM$

The general-purpose register RT is set to the bit-wise and of value in RA and the zero extended 16 bit value in the IMM field.

Exclusive Or xor $rt,$ra,$rb (bit arrangements shown in Table 22)

TABLE 22

| 31    26 | 25    21 | 20    16 | 15    11 | 10    0 |
|----------|----------|----------|----------|---------|
| 0x14 | RT | RA | RB | |

$RT \leftarrow RA\hat{\ }RB$

The general-purpose register RT is set to the bit-wise exclusive-or of the values in RA and RB.

Exclusive or Immediate xori $rt,$ra,imm (bit arrangements shown in Table 23)

TABLE 23

| 31    26 | 25    21 | 20    16 | 15    0 |
|----------|----------|----------|---------|
| 0x15 | RT | RA | IMM |

$RT \leftarrow RA\hat{\ }IMM$

The general-purpose register RT is set to the bit-wise exclusive OR of value in RA and the zero extended 16 bit value in the IMM field.

Complement and And cand $rt,$ra,$rb (bit arrangements shown in Table 24)

TABLE 24

| 31    26 | 25    21 | 20    16 | 15    11 | 10    0 |
|----------|----------|----------|----------|---------|
| 0x16 | RT | RA | RB | |

$RT \leftarrow \sim RA\&RB$

The general-purpose register RT is set to the bit-wise and of the complement of the value RA with the value in RB.

Complement and And Immediate candi $rt,$ra,imm (bit arrangements shown in Table 25)

TABLE 25

| 31    26 | 25    21 | 20    16 | 15    0 |
|----------|----------|----------|---------|
| 0x17 | RT | RA | IMM |

$RT \leftarrow \sim RA\&IMM$

The general-purpose register RT is set to the bit-wise and of the complement of the value RA with the zero extended 16 bit value in IMM.

Load ld $rt,$rb,off (bit arrangements shown in Table 26)

TABLE 26

| 31    26 | 25    21 | 20    16 | 15    11 | 10    0 |
|----------|----------|----------|----------|---------|
| 0x20 | RT | | RB | OFF |

$RT \leftarrow MEM[RB + sign(OFF)]$

The general-purpose register RT is set to the word in engine data memory at the address that is the sum of RB and the sign extended 11 bit value encoded in OFF.

Load Absolute lda $rt,imm (bit arrangements shown in Table 27)

TABLE 27

| 31   26 | 25   21 | 20   16 | 15   0 |
|---------|---------|---------|--------|
| 0x21    | RT      |         | IMM    |

RT ← MEM[IMM]

The general-purpose register RT is set to the word in engine data memory at the address that is the zero extended 16 bit value in the IMM field.

Load Update (Bit Arrangements Shown in Table 28)

ldu $rt,$rb,off

TABLE 28

| 31   26 | 25   21 | 20   16 | 15   11 | 10   0 |
|---------|---------|---------|---------|--------|
| 0x22    | RT      |         | RB      | OFF    |

RT ← MEM[RB + sign(OFF)]
RB ← RB + sign(OFF)]

The general-purpose register RT is set to the word in engine data memory at the address that is the sum of RB and the sign extended 11 bit value encoded in OFF. The value stored in register RB is incremented by the sign extended value of OFF.

RB is a local register.

Store st $ra,$rb,off (bit arrangements shown in Table 29)

TABLE 29

| 31   26 | 25   21 | 20   16 | 15   11 | 10   0 |
|---------|---------|---------|---------|--------|
| 0x24    |         | RA      | RB      | OFF    |

MEM[RB + sign(OFF)] ← RA

The word in engine data memory at the address that is the sum of RB and the sign extended 11 bit value encoded in OFF is set to the value stored in register RA.

Store Absolute lda $rt,imm (bit arrangements shown in Table 30)

TABLE 30

| 31   26 | 25   21 | 20   16 | 15   0 |
|---------|---------|---------|--------|
| 0x25    |         | RA      | IMM    |

MEM[IMM] ← RA

The word in engine data memory at the address IMM is set to the value stored in register RA.

Store Update st $ra,$rb,off (bit arrangements shown in Table 31)

TABLE 31

| 31   26 | 25   21 | 20   16 | 15   11 | 10   0 |
|---------|---------|---------|---------|--------|
| 0x26    |         | RA      | RB      | OFF    |

MEM[RB + sign(OFF)] ← RA
RB ← RB + sign(OFF)]

The word in engine data memory at the address that is the sum of RB and the sign extended 11 bit value encoded in OFF is set to the value stored in register RA. The value stored in register RB is incremented by the sign extended value in OFF. RB in a local register.

Jump j cc,$ra,$rb (bit arrangements shown in Table 32)

TABLE 32

| 31   26 | 25 | 21 | 20   16 | 15   11 | 10   0 |
|---------|----|----|---------|---------|--------|
| 0x30    |    | CC | RA      | RB      |        |

```
if CC == 0b000 // always
    PC ← RB
if CC == 0b001 // equal
    if RA == 0
        PC ← RB
if CC == 0b010 // greater than or equal
    if RA >= 0
        PC ← RB
if CC == 0b011 // greater than
    if RA > 0
        PC ← RB
if CC == 0b101 // not equal
    if RA != 0
        PC ← RB
if CC == 0b110 // less then
    if RA < 0
        PC ← RB
if CC == 0b111 // leass then or equal
    if RA <= 0
        PC ← RB
```

As shown in the above pseudo code, the jump instruction, when executed, may compare the value in general-purpose register RA against 0, based on the condition code (CC) value. If the result is true, then the value in RB is loaded into PC, where CC value of 0b000 is always true, so the jump is taken unconditionally. CC value of 0b100 is undefined.

Jump Absolute ja cc,$ra,$rb (bit arrangements shown in Table 33)

TABLE 33

| 31   26 | 25 | 21 | 20   16 | 15   0 |
|---------|----|----|---------|--------|
| 0x31    |    | CC | RA      | IMM    |

```
if CC == 0b000 // always
    PC ← IMM
if CC == 0b001 // equal
    if RA == 0
        PC ← IMM
if CC == 0b010 // greater than or equal
    if RA >= 0
        PC ← IMM
if CC == 0b011 // greater than
    if RA > 0
        PC ← IMM
if CC == 0b101 // not equal
    if RA != 0
        PC ← IMM
if CC == 0b110 // less then
    if RA < 0
        PC ← IMM
if CC == 0b111 // less then or equal
    if RA <= 0
        PC ← IMM
```

As shown in the above pseudo code, the jump absolute instruction, when executed, may compare the value in general-purpose register RA against 0, based on the condition code. If the result is true, then the value in the IMM field of the instruction is loaded into PC. CC value of 0b000 is always true, so the jump is taken unconditionally. CC value of 0b100 is undefined Wait wait cc,$ra (bit arrangements shown in Table 34)

TABLE 34

| 31 26 | 25 | 21 | 20 16 | 15 0 |
|---|---|---|---|---|
| 0x33 | | CC | RA | |

```
if CC == 0b000 // always
    SKIP
if CC == 0b001 // eqal
    if RA != 0
        PC ← PC
if CC == 0b010 // greater than or equal
    if RA < 0
        PC ← PC
if CC == 0b011 // greater than
    if RA <= 0
        PC ← PC
if CC == 0b101 // not equal
    if RA == 0
        PC ← PC
if CC == 0b110 // less then
    if RA >= 0
        PC ← PC
if CC == 0b111 // less then or equal
```

-continued

```
    if RA > 0
        PC ← PC
```

As shown in the above pseudo code, the wait instruction, when executed, may compare the value in general-purpose register RA against 0, based on the condition code. If the result is false, then the instruction is repeated. A value of 0b000 is always true, so the instruction is a no-operation instruction. CC value of 0b100 is undefined.

This instruction can be used to co-ordinate activities between engines. Generally, RA is a global register. An engine will wait on a global register till another engine writes to that register.

Call call $rt,$rb (bit arrangements shown in Table 35)

TABLE 35

| 31 26 | 25 21 | 20 16 | 15 11 | 10 0 |
|---|---|---|---|---|
| 0x34 | RT | | RB | |

```
RT ← PC + 1
PC ← RB
```

The general-purpose register RT is set to the address of the next instruction, and the PC is set to the value of register RB.

Call Immediate calli $rt,imm (bit arrangements shown in Table 36)

TABLE 36

| 31 26 | 25 21 | 20 16 | 15 0 |
|---|---|---|---|
| 0x35 | RT | | IMM |

```
RT ← PC + 1
PC ← IMM
```

The general-purpose register RT is set to the address of the next instruction, and the PC is set to the value of the zero extended 16 bit value in the IMM field.

Input input lp,$rb (bit arrangements shown in Table 37)

TABLE 37

| 31 26 | 25 24 | 21 20 | 16 15 | 11 10 | 0 |
|---|---|---|---|---|---|
| 0x38 | LP | | | RB | |

Input is a special instruction for controlling the input circuit block. See the inputi instruction below for details. In the input instruction, the value in RB is used in place of the immediate values encoded in the inputi instruction.

Input Immediate inputi lp,typ,mod,size (bit arrangements shown in Table 38)

TABLE 38

| 31 26 | 25 24 | 21 20 | 16 15 | 11 10 | 9 8 | 7 6 | 4 3 | 0 |
|---|---|---|---|---|---|---|---|---|
| 0x39 | LP | | | TYP | MOD | | SIZE | |

```
external = R15 · R10
presuit = R9
if TYP == 0b00 // half-precision floating point, fp16
    bytes = 2
elif TYP == 0b10 || TYP == 0b11 // unsigned, signed byte
    bytes = 1
for( i = 0, j = 0; i < (SIZE+1)*16; i+= bytes, j+= 2)
    raw = EXT[external+i*bytes] // raw is 2B if bytess is 2, 1B if
    bytes is 1
    if TYPE == 0b00
        val = raw
    elif TYPE == 0b10
        val = convert_unsigned_byte_to_fp16( raw )
    elif TYPE == 0b11
        val = convert_signed_byte_to_fp16( raw )
    if MOD == 0b00
        MEM[presuit+j] ← val
    elif MOD == 0b10
        for( sl = 0; sl < 8; sl++ ) // broad cast to each slice
            MEM [sl·presultr_{18..0} + j] ← val
R9 ← R9 + R12
R10 ← R10 + R13
if LP == 0b0 && R8 != 0
    PC ← PC
    R8 ← R8-1
```

Inputi is a special instruction for controlling the input block. The instruction implicitly uses $r8, $r9, $r10, $r12, $r13 and $r15, and updates $r8, $r9 and $r10:

Values are read from external memory at the address formed by the concatenation of $r15 and $r10. The concatenation is used because the external addresses could be larger than 32 bits;

The values that are read in can either be treated as half-precision values, or as bytes, based on TYP. If they are bytes, then they are converted to the equivalent half-precision value;

The possibly converted values are written to the internal memory at addresses identified by $r9. Based on the value of the MOD field, this can either be a single global write or a broadcast to all slices. If it is a broadcast, then the value in $r9 is treated as an offset into each slice, and the converted value is written to each slice at that offset. Otherwise $r9 is treated as an address, and the value is written to that address;

The number of bytes read is specified by the SIZE (SZ) field; each time the instruction is executed it will read $16*(SZ+1)$ bytes;

The instruction increments the value in $r9 with the value in $r12 and the value in $r10 with the value in $r13; and If the LP field is 1, then the instruction will implicitly loop decrementing $r8 till $r8 is 0.

The filter processor may execute the following instructions specified according to filter ISA 112:

Filter filter lp,$rb (bit arrangements shown in Table 39)

TABLE 39

| 31 | 26 | 25 | 24 | 21 | 20 | 16 | 15 | 11 | 10 | 0 |
|----|----|----|----|----|----|----|----|----|----|---|
| 0x3A | | LP | | | | | | RB | | |

Filter is a special instruction to control the filter circuit block. See the filteri instruction for details. In the filter instruction, the value in RB is used in place of the immediate values encoded in the filteri instruction.

Filter Immediate filteri lp,typ,mod,size (bit arrangements shown in Table 40)

TABLE 40

| 31 | 26 | 25 | 24 | 21 | 20 | 16 | 15 | 7 | 6 | 5 | 4 | 3 | 0 |
|----|----|----|----|----|----|----|----|---|---|---|---|---|---|
| 0x3B | | LP | | | | | MASK | | SUM | MOD | KIND | DATA | |

```
presult = R9
pdata  = R10
psum   = R11
if KIND == 0b00 || ( kind == 0b10 && R8_0 != 0 ) || ( kind == 0b10 &&
R8_{1..0} != 0b00)
        noresult = true
else
        noresult = false
for( sl = 0; sl < 8; sl++ )
        if R15_{sl} = 1 // R15 masks off slices
                continue;
        // read input
        pdata = R10
        if DATA = 0b000
                nhws = 3
                elif DATA == 0b100
                        nhws = 6
                elif DATA == 0b010 || DATA == 0b110 or
DATA == 0b111 // DATA 1,3,5 are undefined
                        nhws = 9
        for( i = 0; i < nhws; i++ )
                if MASK_i = 0
                        in[i] = MEM[pdata+i]
                else
                        in[i] = 0
        // update weight/input registers
        if DATA == 0b00
                for( i = 8; i >= 3; i-- )
                        WEIGHT [i] ← WEIGHT[i-3]
                        for( i = 2; i >= 0; i-- )
                                WEIGHT [i] ← in[i]
        elif DATA = 0b010
                for( i = 8; i >= 0; i-- )
                        WEIGHT [i] ← in[i]
        elif DATA = 0b100
                for( f = 0; f < 4; f++ )
```

-continued

```
                for( i = 8; i >= 3; i-- )
                        INPUT[f,i] ← INPUT[f,i-3]
                        for( i = 2; i >= 0; i-- )
                                INPUT[f,i] ← in[i+f]
        elif DATA = 0b110
                for( f = 3; f >= 0; f-- )
                        for( i = 8; i >= 3; i-- )
                                INPUT[f,i] ← INPUT[f,i-3]
                                for( i = 2; i >= 0; i-- )
                                        INPUT[f,i] ← in[i+2*f]
        elif DATA = 0b111
                for( f = 3; f >= 1; f-- )
                        for( i = 8; i >= 0; i-- )
                                INPUT[f,i] ← INPUT[f-1,i]
                for( i = 8; i >= 0; i-- )
                        INPUT[0,i] ← in[i]
// check to see if filter result is being needed
if noresult
        continue;
for( f = 0; f < 4; f++ )
        sum[f] = 0
        for( i = 0; i < 9; i++ )
                sum[f] += WEIGHT[i] * INPUT[f,i]
        if MOD = 1 // slice mode
                if SUM = 1 // with partial sum
                        sum[f] += MEM[sl·psum_{17..0} + f]
                MEM [sl·presult_{17..0} + f] ← sum[f]
// end slice loop
if MOD = 0 // global mode
        for( f = 0; f < 4; f++ )
                gsum[f] = 0;
                for( sl = 0; sl < 8; sl++ )
                        if R15_{sl} = 0
```

-continued

```
                                gsum[f] += sum[f]
                if SUM = 1 // with partial sum
                        gsum[f] += MEM[psum+f]
                MEM[presult + f] ← gsum[f]
R10 ← R10 + R13
if !inactive
        R9 ← R9 + R12
        if SUM = 1
                R11 ← R14
if LP == 0b0 && R8 != 0
        PC ← PC
        R8 ← R8-1
```

Filteri is a special instruction to control the filter block. The instruction implicitly uses $18 through $r15, and potentially updates $r8 through $r11.

The controls are done mostly on a per slice basis. $r15 may contain eight bits representing an enable/disable flag for a corresponding one of eight slices. By setting a bit in $r15 to 1, the filter processor 122 may disable filtering in the corresponding slice;

The filteri instruction may read a value from internal memory at the address specified in $r10; depending on the value of the DATA field, the value of 3, 6, or 9 can be read;

These values can be zeroed if the corresponding MASK bit is high;

The values are written to the WEIGHT or INTPUT internal registers;

It is possible that the only action of the filter operation is to load the instructions; this happens if:

KIND is 0b00;

KIND is 0b10 and the value in $r8 is not 0 mod 2; or

KIND is 0xb11 and the value in $r8 is not 0 mod 4;

Otherwise 4 dot products of WEIGHT and INPUT are computed in each slice;

If MOD is 1 (i.e. per slice) and SUM is 1 (i.e. partial sum), 4 values are read from each slice using $r11 to provide the offset, and added to each of the dot-products;

If MOD is 1 (i.e. per slice), then the final 4 sums are written to memory in each slice at the offset in $r9;

Otherwise if MOD is 0 (i.e. global) all the 4 sums from each of the enabled slices are summed together giving 4 values;

If MOD is 0 (i.e. global) and SUM is 1 (i.e. partial sum), 4 values are read from memory globally using $r11 as the address and added to each of the 4 sums;

If MOD is 0 (i.e. global) the final 4 sums are written to memory at the address in $r9;

The instruction increments the value in $r10 with the value in $r13;

If the filter computes a result, the value in $r9 is incremented with the value in $r12;

If the filter computes a result and SUM-0b1, value in $r11 is incremented with the value in $r14; and If the LP field is 1, then the instruction will implicitly loop decrementing the value in $r8 till the value in $r8 is 0.

The post-processing processor may execute the following instructions specified according to post-processing ISA 114:

Post post lp,$rb (bit arrangements shown in Table 41)

TABLE 41

| 31 | 26 | 25 | 24 | 21 | 20 | 16 | 15 | 11 | 10 | 0 |
|---|---|---|---|---|---|---|---|---|---|---|
| 0x3C | | LP | | | | | | RB | | |

Post is a special instruction to control the post-processing circuit block. See description of the posti instruction below for details. In the post instruction, the value in RB is used in place of the immediate values encoded in the posti instruction.

Post Immediate posti lp,ctl,row,col,kind,act (bit arrangements shown in Table 42)

TABLE 42

| 31 | 26 | 25 | 24 | 21 | 20 | 16 | 15 | 10 | 9 | 8 | 7 | 6 | 5 | 4 | 3 | 2 | 1 | 0 |
|---|---|---|---|---|---|---|---|---|---|---|---|---|---|---|---|---|---|---|
| 0x3D | | LP | | | | | | | | CTL | | ROW | | COL | | KIND | | ACT |

```
presuit = R9
pdata   = R10
//compction: max-pool, decimation
if KIND == 0b00 || KIND == 0b01
    // read data
    if COL == 0b00
        n = 4       // 4x 1->1
        g = 4
    elif COL == 0b01
        n = 8       // 4x 2->1
        g = 4
    elif COL = 0b10
        n = 6       // 2x 3->1 compact
        g = 2
    elif COL = 0b11
        n = 8       // 2x 4->1 compact
        g = 2
    for( i =0; i < n; i++ )
```

-continued

```
        in[i] = MEM[pdata+i]
    // compact data
    if KIND == 0b00 // pool
        if COL == 0b00
            for ( i = 0; i < 4; i++ )
                compact[i] = in[i]
        elif COL = 0b01
            for ( i = 0; i < 4; i++ )
                compact[i] = max(in[2*i], in[2*i+1])
        elif COL = 0b10
            for ( i = 0; i < 2; i++ )
                compact[i] = max(in[3*i], in[3*i+1], in[3*i+2])
        elif COL = 0b11
            for ( i = 0; i < 2; i++ )
                compact[i] = max(in[4*i], in[4*i+1], in[4*i+2],
                in[4*i+3])
    elif KIND == 0b01 // decimation
        if COL == 0b00
            for ( i = 0; i < 4; i++ )
                compact[i] = in[i]
        elif COL = 0b01
            for ( i = 0; i < 4; i++ )
                compact[i] = in[2*i]
        elif COL = 0b10
            for ( i = 0; i < 2; i++ )
                compact[i] = in[3*i]
        elif COL = 0b11
            for ( i = 0; i < 2; i++ )
                compact[i] = in[4*i]
    if ROW == 0b10 || ROW == 0b10
        for( i = 0; i < g; i++ )
            compact[i] = max( compact[i], REG[i] )
    // either produce result for activation logic, or save
```
$$\text{if ROW} == 0b00 \ || \ (\text{ROW} == 0b01 \ \&\& \ R8_0 = 0) \ ||$$
$$(\text{ROW} == 0b11 \ \&\& \ R8_{1..0} == 0b00)$$
```
        result = true
    else
        result = false
    if !result
        for( i =0; i < g; i++ )
            REG[i] ← compact[i]
    else
        for( i =0; i < g; i++ )
            if ACT == 0b00
                vals[i] = compact[i]
            elif ACT == 0b01
                vals[i] = ReLU( compact[i] ) // max with 0 (aka
                rectifier)
            elif ACT == 0b10
                vals[i] = Approx_Logistic( compact[i] ) // logistic
```

-continued

```
function (aka sigmoid)
            elif ACT == 0b11
                vals[i] = Approx_Tanh( compact[i] ) // tanh function
        for( i =0; i < g; i++ )
            MEM[presult+i] ← vals[i]
    // end comaction
elif KIND == 0b10 // find top-N
    if CTL == 0b11 // first iteration of first search
        SAVE_MAX ← +∞
        SAVE_POS ← 0
        CURR_MAX ← -∞
        CURR_COUNT ← 0
    elif CTL = 0b10 // first iteration of subsequent passes
        SAVE_MAX ← CURR_MAX
        SAVE_POS ← CURR_POS
        CURR_MAX ← -∞
        CURR_COUNT ← 0
```

25

-continued

```
for( i =0; i <4; i++ )
    in[i] = MEM[pdata+i]
for( i =0; i <4; i++ )
    if in[i] < SAVE_MAX || ( in[i] ==
SAVE_MAX && CURR_COUNT+i > SAVE_POS )
        if in[i] > CURR_MAX
            CURR_MAX ← in[i]
            CURR_POS ← CURR_COUNT+i
CURR_COUNT ← CURR_COUNT+4
if CTL = 0b01 // last iteration of a pass
    result = true
    MEM[presult+0] = CURR_MAX
    MEM[presult+1] = CURR_POS
else
    result = false
R10 ← R10 + R13
if result
    R9 ← R9 + R12
if LP == 0b0 && R8 != 0
    PC ← PC
    R8 ← R8−1
```

Posti is a special instruction to control the post-processing circuit block. The instruction implicitly uses $r8, $r9, $r10, $r12, and $r13 and potentially updates $r8 through $r10. There are two possible modes of operation; the first is compaction [KIND=0b00 or KIND-0b01].

The posti instruction, when executed, may read values from the internal memory at the address specified in $r10; depending on the value of the COL field, the value of 4, 6, or 8 can be read;
4 if COL is 0b00
8 if COL is 0b01 or 0b10
6 if COL is 0b10
The values are grouped into either four or two groups, based on the value of COL;
4 groups of 1 if COL is 0b00
4 groups of 2 if COL is 0b01
2 groups of 3 if COL is 0b10
2 groups of 4 if COL is 0b11
The groups are compacted by taking the maximum of the group (if KIND==0b00) or the first element of the group (if KIND==0b10). If COL is 0b00, then there is no change;
If ROW is non-zero, then the maximum of the compacted elements and the values saved in internal state REG are computed;
If ROW is 0b01 and $r8 is not 0 mod 2, or ROW is 0b11 and $r8 is not 0 mod 4, then the maximum values are saved in the internal registers REG;

Otherwise, the maximum values are sent to the activation circuit;
Depending on the value of the ACT field one of the following functions is applied to the maximum values:
Identity function (ACT==0b00)
Step function (ACT==0b01)
Sigmoid function (ACT=0b10)
Hyperbolic tangent function (Tanh) (ACT=0b11).
The sums of 2 or 4 function results are written to memory at the address stored in $r9;

The instruction increments the value in $r10 with the value in $r13;
If the post instruction computes a result, the value in $r9 is incremented with the value in $r11;
If the LP field is 1, then the instruction will implicitly loop decrementing the value in $r8 till the value in $r8 is 0.
The second mode of operation is top-N search [KIND=0b10].
If CTL is 0b11 or 0b10, internal state is initialized
    if CTL is 0b11, SAVE_MAX/SAVE_POS are set to +Inf and 0,
    if CTL is 0b10, CURR_MAX/CURR_POS (the previously determined maximum value/position) are copied to SAVE_MAX/SAVE_POS, or
    CURR_COUNT is reset to 0;
four input values are read from the internal memory at the address specified in $r10;
for each of the input values, the post instruction determines if it is acceptable given SAVE_MAX/SAVE_POS. It is acceptable if
the value is smaller than SAVE_MAX, or
the value is equal to SAVE_MAX, but the value's position is larger than SAVE_POS
for each acceptable input value, if it is larger than the current maximum, its value and position are saved in CURR_MAX and CURR_POS;
if CTL is 0b01, the CURR_MAX and CURR_POS are written to memory at the address in $r9;
the instruction increments the value in $r10 with the value in $r13;
if the post instruction computes a result, the value in $r9 is incremented with the value in $r11; and
if the LP field is 1, then the instruction will implicitly loop decrementing the value in $r8 till the value in $r8 is 0.
The output processor may execute the following instructions specified according to output ISA 114:
Output
    output lp,$rb (bit arrangements shown in Table 43)

TABLE 43

| 31 | 26 | 25 | 24 | 21 | 20 | 16 | 15 | 11 | 10 | 0 |
|---|---|---|---|---|---|---|---|---|---|---|
| 0x38 | | LP | | | | | | RB | | |

Output is a special instruction to control the output circuit block. See the description outputi instruction below for details. In the output instruction, the value in RB is used in place of the immediate values encoded in the outputi instruction.
Output Immediate
    outputi lp,ty (bit arrangements shown in Table 44)

TABLE 44

| 31 | 26 | 25 | 24 | 21 | 20 | 16 | 15 | 11 | 10 | 9 | 8 | 7 | 6 | 4 | 3 | 0 |
|---|---|---|---|---|---|---|---|---|---|---|---|---|---|---|---|---|
| 0x39 | | LP | | | | | | | TYP | | MOD | | | | SIZE | |

```
external = R15 · R9
pdata = R8
if TYP == 0b00 // half-precision floating point, fp16
    bytes = 2
elif TYP == 0b10 || TYP == 0b11 // unsigned, signed byte
    bytes = 1
for( i = 0, j = 0; i < 8; i++, j+= bytes)
    raw = MEM[pdata+i] // raw is 2B if bytess is 2, 1B if bytes is 1
    if TYPE == 0b00
        val = raw
    elif TYPE == 0b10
```

27

-continued

```
        val = convert__fp16__to__unsigned__byte ( raw )
    elif TYPE == 0b11
        val = convert__fp16__to__signed__byte__to__fp16( raw )
EXT[external+j] ← val
R9 ← R9 + R12
R10 ← R10 + R13
if LP == 0b0 && R8 != 0
    PC ← PC
    R8 ← R8–1
```

Outputi is a special instruction to control the input block. The instruction implicitly uses $r8, $19, $r10, $r12, $r13 and $r15, and updates $r8,$r9 and $r10

The outputi instruction, when executed, may read eight values from the internal memory at the address specified in $r10;

The eight values that are read in can either be treated as half-precision values, or as bytes, based on the type specified in TYP. If they are bytes, then they are converted to the equivalent half-precision value;

The possibly converted values are written to external memory 104 at the address formed by the concatenation of values stored in $r15 and $r9. The concatenation is needed because the external addresses could be larger than 32 bit;

The instruction increments the value in $r9 with the value in $r12 and the value in $r10 with the value in $r13; and.

If the LP field is 1, then the instruction will implicitly loop decrementing the value in $r8 till the value in $r8 is 0.

Figure 7:
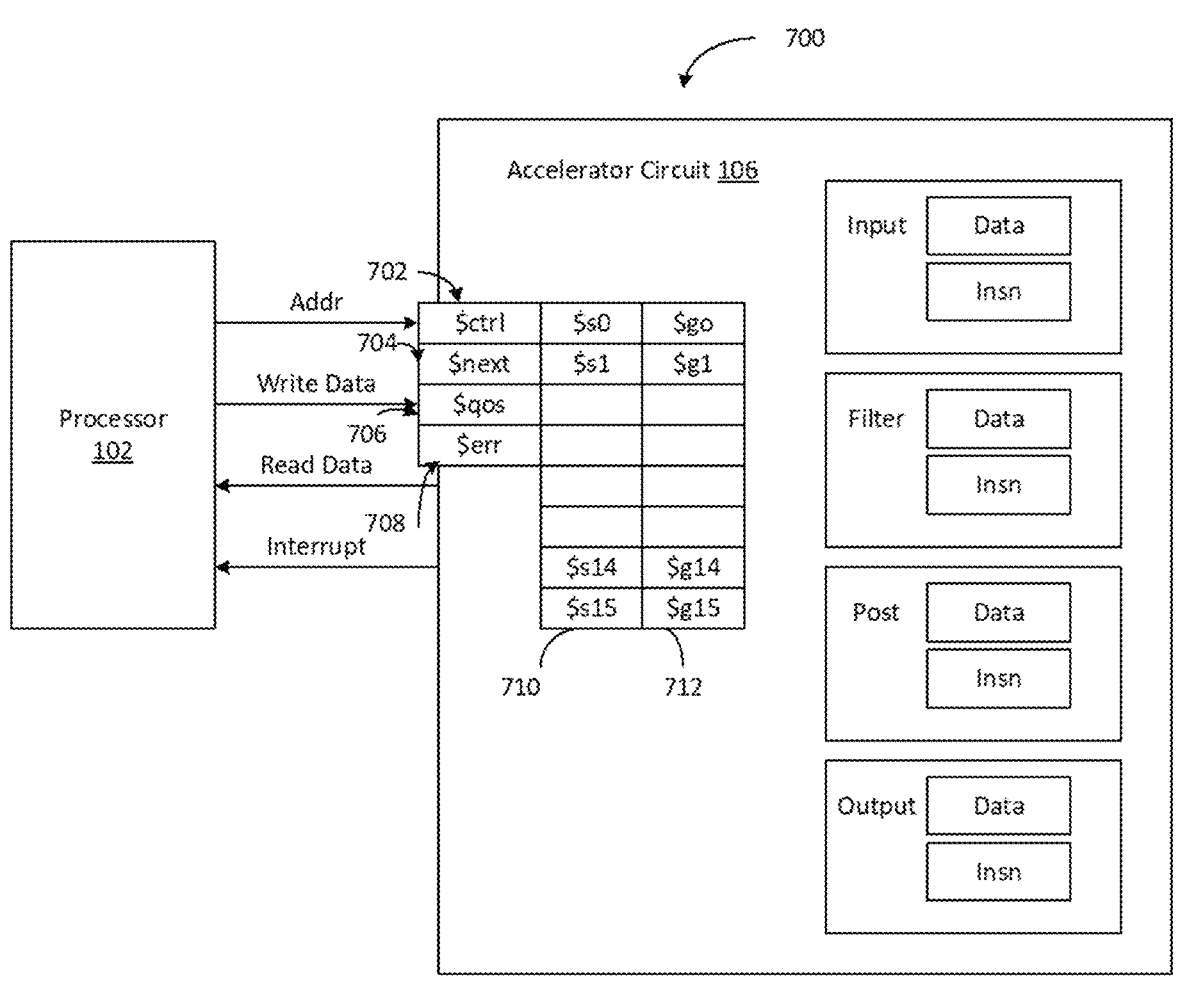
FIG. 7 illustrates a system that uses a set of registers as the interface between a processor and an accelerator circuit according to an implementation of the disclosure.

Processor 102 may use a set of registers to set up tasks for the GSNN accelerator circuit 106, while the GSNN accelerator circuit 106 may use the set of registers to communicate accelerator circuit status to processor 102 during operation. FIG. 7 illustrates a system 700 that uses a set of registers as the interface between a processor and an accelerator circuit according to an implementation of the disclosure. As shown in FIG. 7, system 700, similar to the system shown in FIG. 1, may include a processor 102 and an accelerator circuit 106 that may further include an input circuit block, a filter circuit block, a post-processing circuit block, and an output circuit block. Accelerator circuit 106 may further include a set of registers to serve as an interface between processor 102 and accelerator circuit 106.

The register interface may include a control register ($ctrl) 702, a next task register ($next) 704, an AXI QoS register ($qos) 706, an error register ($err) 708, shadow registers ($s0-$s15) 710, and global registers ($g0-$15) 712. Control register ($ctrl) 702 may contain the interrupt pending flag and interrupt enable flag as well as various reset control flags. Error register ($err) 708 may record different kinds of errors. AXI QoS register ($qos) 706 may contain controls for the external memory bus interface. Next task register ($next) 704 may contain a mask of the global registers that may be overwritten when the next task is started. Shadow registers ($s0-$s15) 710 may contain the values that may be used to overwrite global registers ($g0-$15) 712 under the control of the $next register 704.

Processor 102 may read and write global registers ($g0-$15) 712, and the data and instruction memory associated with each processor. The processors (input, filter, post-processing, output) can trigger interrupts and signal task completion by writing to global register $g15. If a value indicating that bit 31 is set is written to $g15, it signals end of task. If a value indicating that bit 30 is set is written to $g15, it raises an interrupt to the processor, generally indicating a certain kind of situation that requires processor intervention.

The states of different registers are described in the following:

Control Register ($ctrl) (bit arrangements shown in Table 45)

TABLE 45

| 11 | | 8 | 7 | | 4 | 3 | | 2 | 0 |
|---|---|---|---|---|---|---|---|---|---|
| INTERRUPT | | | EN_INTERRUPT | | | STALL | | RESETB | |

The control register has the following fields:

RESETB [bit 0]: when clear, the GSNN is reset. On startup, the RESETB is clear;

STALL [bits 2, 3]: When both bits are set, the four processors (input, filter, post-processing, and output) are stalled; no instructions are executed.

EN_STALL [bit 2]: is set to enable stalling

STALL [bit 3]: will be set automatically when an error condition is detected;

EN_INTERRUPT [bits 4-7]: When an EN_INTERRUPT is set, and its corresponding INTERRUPT bit is set, an interrupt is raised to the controlling processor 102

EN_COPY_INT [bit 4]: Enables COPY_INT [bit 8] interrupts,

EN_UNAVAIL_INT [bit 5]: Enables UNAVAIL_INT [bit 9] interrupts,

EN_G15_INT [bit 6]: Enables G15_INT [bit 10] interrupts,

EN ERR_INT [bit 7]: Enables ERR_INT [bit 11] interrupts;

INTERRUPT [bits 8-11]: When a bit in the INTERRUPT field is set, it will raise an interrupt to the processor 102, assuming the corresponding EN_INTERRUPT bit is set.

COPY_INT [bit 8]: $g15 is written with bit 31 set and bit 15 of $next register is set, UNAVAIL_INT [bit 9]: $g15 is written with bit 31 set and bit 15 of $next is clear, G15_INT [bit 10]: $g15 is written with bit 30 set, ERR_INT [bit 11]: an error condition is encountered.

The control registers can be modified by the control processor 102 writing to locations 0x200c0/0x200c4/0x200c8. These cause different modifications to the control register, 0x200c0 [copy]: the value being written is copied to the control register, 0x200c4 [set-on-1]: the value being written is OR-ed with the control register, 0x200c8 [clear-on-1]: the complement of the value being written is and-ed with the control register.

The control register can be read by the processor using address 0x200c0.

Error Register (Serr) (Bit Arrangements Shown in Table 46)

TABLE 46

| 15 | 14 | 8 | 7 | 6 | 5 | 4 | 3 | 2 | 1 | 0 |
|---|---|---|---|---|---|---|---|---|---|---|
| | COLLISION | | RRESP | | BRESP | | | OUT | IN | |

The error register records the following kinds of errors:

IN [bits 0, 1]: malformed input block external read address:

IN_ALIGN [bit 0]: the address is not 16B aligned,

IN_PAGE [bit 1]: the bytes read cross a 4 KB boundary;

OUT [bit 2]: malformed output block external write address

OUT_ALIGN [bit 2]: the address is not 8B/16B aligned (byte write/half-word write);

BRESP [bits 4-5]: the external (AXI) bus returned a non-zero BRESP to a write, and the value is copied to the BRESP field;

RRESP [bits 6-7]: the external (AXI) bus returned a non-zero RRESP to a write, and the value is copied to the RRESP field;

COLLISION [bits 8-14]: there were simultaneous accesses to the same bank from different read/write ports. The COLLISION field has a bit for all ports that collided. These are:

IN_RES_COLL [bit 8]: the input unit write port;

FILT_DATA_COLL [bit 9]: the filter unit data read port;

FILT_PSUM_COLL [bit 10]: the filter unit partial sum read port;

FILT_RES_COLL [bit 11]: the filter unit write port;

POST_DATA_COLL [bit 12]: the post unit data read post;

POST_RES_COLL [bit 13]: the post unit result write port;

OUTPUT_DATA_COLL [bit 14]: the output unit read port;

The error register can be accessed from the processor 102 using address 0x200f0.

QoS Register ($Qos) (Bit Arrangements Shown in Table 47)

TABLE 47

| 15 | 8 | 7 | 4 | 3 | 0 |
|----|---|---|---|---|---|
|    |   | AWQOS | | ARQOS | |

The ARQOS [bits 0-3]/AWQOS [bits 4-7] fields are used by the AXI external memory bus.

The qos register can be accessed from the processor 102 using the address 0x200e0.

Next Register (Snext) (Bit Arrangements Shown in Table 48)

TABLE 48

| 15 | 0 |
|----|---|
| EN |   |

The next register may control the copying of shadow registers to global registers. If bit 15 of the $next register is set to 1, and $g15 is written with bit 31 set to 1, then if bit i of the next register is 1, shadow register $si is copied to global register $gi. Since copying occurs only if bit 15 is set, this means that $g15 will always get copied. After copying, bit 15 of $next is cleared.

The processor may access the next register $next at address 0x200d0.

Shadow Registers ($s0-$s15) (Bit Arrangements Shown in Table 49)

TABLE 49

| 31 | 0 |
|----|---|

There are 16 32-bit shadow registers, $s0-$s15. When a copy event occurs, a shadow register may be copied to the corresponding global register under the control of the $next register Shadow register i can be accessed by the processor at addresses 0x20040+4*i.

Global Registers ($g0-$g15) (Bit Arrangements Shown in Table 50)

TABLE 50

| 31 | 0 |
|----|---|

There are 16 32-bit global registers, $g0-$g15. When a copy event occurs, a shadow register may be copied to the corresponding global register under the control of the $next register.

Global registers can be used by the processors as part of their normal instructions.

Writes to $g15 are specially treated:

If bit 31 of $g15 is written as 1 and bit 15 of $next is 1, a copy event occurs.

Shadow registers are copied to the global registers under the control of the bits in the $next register;

bit 15 of the $next register is cleared;

The COPY_INT bit in the $ctrl register is set.

If bit 31 of $g15 is written as 1 and bit 15 of $next is 0, a copy unavailable event occurs; the UNAVAIL_INT bit in the $ctrl register is set.

If bit 30 of $g15 is written as 1, G15_INT bit in the $ctrl register is set.

Global register i can be accessed by the processor at addresses 0x20010+4*i.

Engine Instruction/Data Memories

Processor 102 may access the words in the instruction and data memories of the engines. There are 16 KB of instruction and 16 KB of data memory per processor. The addresses ranges to use to access each of the memories are:

0x00000 . . . 0x03fff: input processor instruction memory

0x04000 . . . 0x07fff: input processor data memory

0x08000 . . . 0x0bfff: filter processor instruction memory

0x0c000 . . . 0x0ffff: filter processor data memory

0x10000 . . . 0x13fff: post processor instruction memory

0x14000 . . . 0x17fff: post processor data memory

0x18000 . . . 0x1nfff: output processor instruction memory

0x1c000 . . . 0x1ffff: output processor data memory

Processor 102 may use the instruction and data memories associated with processors to load tasks assigned to accelerator circuit 106. To use the GSNN accelerator circuit 106 to perform a neural network calculation, processor 102 may initialize GSNN accelerator circuit 106, partition the neural network application into tasks, set up GSNN accelerator circuit 106 to perform the tasks by chaining the tasks to be executed by a pipeline of processors on GSNN accelerator circuit 106, and request GSNN accelerator circuit 106 to start performance of the tasks. The tasks may include 3×3 convolutional neural network (CNN) filters, variations of the 3×3 CNN filters, CNN filters larger than 3×3 etc.

FIG. 8 depicts a flow diagram of a method 800 to operate a GSNN accelerator circuit by a processor according to an implementation of the present disclosure. Method 800 may be performed by processing devices that may comprise hardware (e.g., circuitry, dedicated logic), computer readable instructions (e.g., run on a general purpose computer system or a dedicated machine), or a combination of both. Method 800 and each of its individual functions, routines, subroutines, or operations may be performed by one or more processors of the processing device executing the method. In certain implementations, method 800 may be performed by a single processing thread. Alternatively, method 800 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 800 may be performed by a processor 102 as shown in FIG. 1.

At 802, processor 102 may initialize a GSNN accelerator circuit communicatively coupled to the processor to perform a neural network application. As described in FIGS. 1-7, the GSNN accelerator circuit may include an input circuit block, a filter circuit block, a post-processing circuit block, and an output circuit block. Each circuit block may include a respective processor which can be a 32-bit RISC processor. Each processor may execute respective instructions specified according to an instruction set architecture (ISA) specific to that processor. For example, the input circuit block may include an input processor to execute instructions specified according to an input ISA; the filter circuit block may include a filter processor to execute instructions specified according to a filter ISA; the post-processing circuit block may include a post-processing processor to execute instructions specified according to a filter ISA; the output circuit block may include an output processor to execute instructions specified according to a filter ISA. Each processor may be associated with an instruction memory and a data memory. The accelerator circuit may further include a general register and an internal memory shared by the circuit blocks. The accelerator circuit may include a set of registers that may serve as an external interface to communicative with processor 102.

The accelerator circuit, at start up, may be in a reset state. Processor 102 may write proper values to the control registers and global registers to start the operation of the accelerator circuit. For example, processor 102 may bring the accelerator circuit out of reset by writing an indicator value (e.g., setting to "1") to the RESETB bit of the control register ($ctrl). Writing the flag value to the control register may enable all interrupts generated at the accelerator circuit and stall the accelerator circuit if an error occurs.

At 804, processor 102 may determine tasks of the neural network application to be performed by one or more of the input circuit block, the filter circuit block, the post-processing circuit block, or the output circuit block. The tasks may include code segments containing instructions to be executed by different circuit blocks. For example, an input code segment may include instructions specified according to the input ISA to be executed by the input processor; a filter code segment may include instructions specified according to the filter ISA to be executed by the filter processor; a post-processing code segment may include instructions specified according to the post-processing ISA to be executed by the post-processing processor; an output processing code segment may include instructions specified according to the output ISA to be executed by the output processor. Processor may store these code segments to the corresponding instruction memories and data associated with execution of these code segments to the data memories associated with the processors.

At 806, processor 102 may assign each of the tasks to a corresponding one of the input circuit block, the filter circuit block, the post-processing circuit block, and the output circuit block. The task assigned to a particular circuit block may include instructions specified according to the ISA of the processor of the circuit block. Processor 102 may store these instruction in the instruction memory of the processor. In one implementation, processor 102 may set up the accelerator circuit to perform the tasks by chaining the tasks to be executed by a pipeline of the processors on the accelerator circuit. The GSNN accelerator circuit is designed to support chaining of tasks using the next register $next, the shadow registers, and the global register $g15. To queue a task for execution while a current task is running on the accelerator circuit, the processor may write the desired values associated with performing the new tasks in the corresponding shadow registers and write a mask for these shadow registers to the next register. In one implementation, the desired values for the global registers includes a new value for $g15, and it is recommended that the value be have bit 31 and bit 30 clear, otherwise they will either kick off a new request or an interrupt.

Tasks running on the GSNN can be programmed so that when a task is finished, the task will signal completion to the processor by writing to $g15 with bit 31 set. This may trigger a copy of the shadow registers to the global registers, starting the new task. The COPY_INT bit of the $ctrl register will be set; if EN_CTL INT bit is also set, an interrupt will be sent to the processor, notifying the processor to schedule the next task.

In one implementation, if the data size of parameters for the tasks do not fit in the global registers (e.g., the data size exceeds the capacity of the global registers), areas of data memory associated with the processor for the task may be reserved and used to store the parameters. The processor can chain commands by writing some of the parameters to the data memories, and then passing the addresses to those parameter blocks in the shadow registers. In this implementation, the shadow registers are used to store the addresses of data memory that stores the parameters for the next task.

In one implementation, processors may form an execution pipeline for coordinated task performance. For example, the input processor may fill input registers for the filter processor which then processes the data in the input registers. Thus, a common pipeline may include the input circuit block supplying data to the filter circuit block, the filter circuit block supplying data to the post-processing circuit block, and the post-processing circuit block supplying data to the output circuit block. The earlier stage is referred to as the producer while the subsequent stage is referred to as the consumer. Processor 102 may use the global registers to co-ordinate each stage of the pipeline. For example, global register $g1 may be used to coordinate the operation between two stages. At the start of the task, the value in $g1 is a known value such as, for example, a value 0. The consumer of the input register may wait for the global register to be non-zero. The producer fills the input registers of the consumer and then sets the value to be 1, indicating that the input registers are ready to be read. The producer then waits for the consumer to signal that the consumer has read the data stored in the input registers. The indication can be achieved by clearing the value of register $g1 to 0. In this way, different stages of the pipeline may work cooperatively without invoking an atomic instruction. This is illustrated in the following code sequence:

```
.engine input
L.0:
        wait eq,$g1
        # produce buffer
        copyi $g1,1
        ja   L.0
.engine filter
L.0:
        wait ne,$g1
        # consume buffer
        copy $g1,0
        ja L.0
```

If there are two input registers that allow the producer to fill for the next stage while the consumer is processing the previous one (so called ping-pong buffers), then the co-ordination code can use two global registers. This can be one per buffer, or a more general approach of read pointer and write pointer can be used. The advantage of using one global register for read pointers and one for write pointer is that it can be extended to producer consumer queues of depth greater than 2.

At 808, processor 102 may instruct the accelerator circuit to start performing the tasks. Processor 102 may start the performance by set a bit flag in the control register to 1.

At 810, processor 102 may receive results from the accelerator circuit performing the tasks. Responsive to receiving the results, the processor may carry out the neural network application based on the results.

A common task for a neural network application is a 3×3 CNN filter operating on an array of data. An example of using instructions executed by the processors of the accelerator circuit to perform the CNN filtering is provided in the following. Assume that the 3×3 filter is operating on an input array of size 66×66, producing outputs of size 64×64, and is processing 8 input channels simultaneously. First, the filter weight is loaded:

```
copyi  $r10,L.filter
filter once,wt9,inactive
```

Then the 4 columns of the first two rows are shifted in

```
copyi   $r10,L.image
copyi   $r13,132   # each input row is 66 elements = 132B apart
filter once,in6,inactive
filter once,in6,inactive
```

After the main loop is done where 64 iterations are done, producing 64 rows of 4 columns filtered output that has been summed across 8 input channels

```
copyi   $r8,64
copyi   $r9,L.result
copyi   $r12,128      # each row is 64 elements = 128B apart
filter  loop,in6,direct,global
```

The code may then produce the results for the other 15×4 columns. The read and read and write pointers need to be modified to point to the next starting point

```
addi     $r10,$r10,-124
addi     $r9,$r9,-120
```

All in all, execution of the code may process 16 groups of 4 columns. This can be achieved by programming a 16 count loop using jump instructions. Putting it all together:

```
copyi          $r10,L.filter
filter         once,wt9,inactive
copyi          $r10,L.image
copyi          $r9,L.result
copyi          $r13,132
copyi          $r12,128
copyi          $r0,16
filter         once,in6,inactive
filter         once,in6,inactive
L.0:
copyi          $r8,64
filter         loop,in6,direct,global
addi           $r10,$r10,-124
addi           $r9.$r9,-120
addi           $r0,$r0,-1
ja             ne,L.0
```

The code may be constructed to process variations of 3×3 filters. If more than 8 input channels are needed, then the channels cam be broken up into groups of 8. The first one is computed as above. In subsequent groups, partial sum mode is used instead of direct, and the partial sum from the previous group is added to the filter. If the total number of channels is not a multiple of 8, $r15 can be set to mask off some number of input channels.

If a bias is added to the filter output, then the first filter would not use direct filter. Instead, partial sum mode is used, and the bias is used as the initial partial sum.

A 5×5 or larger filter can be decomposed into multiple 3×3 filters. First, the larger filters are converted into the nearest multiple of 3 by zero-padding. So, a 5×5 filter may be converted into a 6×6 filter. Then, each of the 3×3 filter would be run separately over the appropriate parts of the input channels. In one implementation, instead of explicitly padding the filters with zeros, wt3 and masks may be applied to different portions of the larger filter.

Implementations of the disclosure may provide data reuse in a fully-connected layer of neural network applications. The data that are reused in a fully connected layer can be the input data. In one implementation, the processor 102 may split the load of the inputs across all stripes in a filter circuit block. Load the inputs 9 elements at time into the weight register. Then, load 4 sets of filters into the input registers of the filter circuit block using instruction filter in9, x4, global. After each 4 loads, the filter circuit block may perform four 72 tap convolutions, with results for 4 different output channels.

Figure 9:
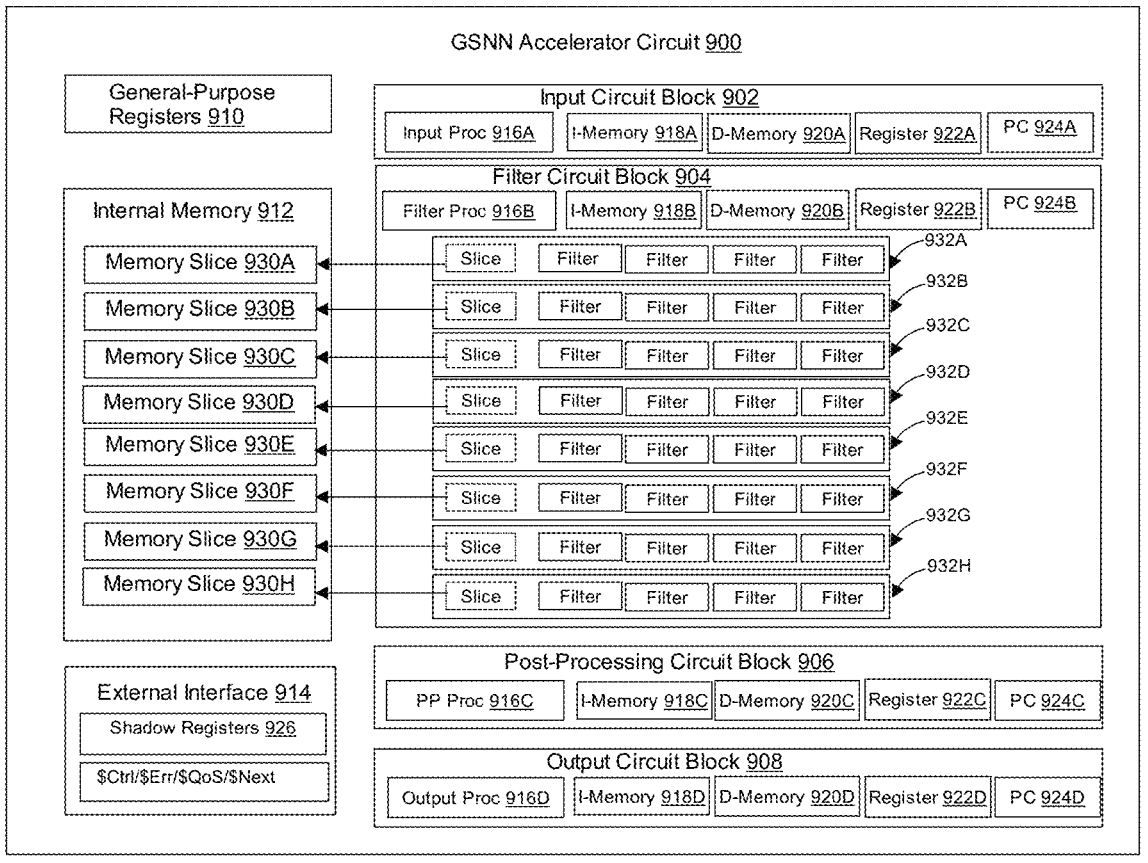
FIG. 9 illustrates a GSNN accelerator circuit in detail according to an implementation of the disclosure.

FIG. 9 illustrates a GSNN accelerator circuit 900 in detail according to an implementation of the disclosure. As shown in FIG. 9, GSNN accelerator circuit 900 may include an input circuit block 902, a filter circuit block 904, a post-processing circuit block 906, and an output circuit block 908, a general-purpose register file including general-purpose registers 910, an internal memory 912, and external interface 914. Input circuit block 902, filter circuit block 904, post-processing circuit block 906, and output circuit block 908 may each include a corresponding input processor 916A, a filter processor 916B, a post-processing processor 916C, an output processor 916D, a respective corresponding instruction memory 918A, 918B, 918C, 918D, and a respective corresponding data memory 920A, 920B, 920C, 920D. Alternatively, two or three circuit blocks may share a common processing processor.

Input circuit block 902, filter circuit block 904, post-processing circuit block 906, and output circuit block 908 may each further include a respective corresponding local registers 922A, 922B, 922C, 922D and a respective corresponding program counter (PC) 924A, 924B, 924C, 924D. Instruction memory 918A, 918B, 918C, 918D may store code segments containing instructions of tasks received from an external processing device (e.g., a computer system, a CPU, or a GPU) assigned to GSNN 900 for carrying out a neural network application. Data memory 920A, 920B, 920C, 920D may store data associated with performing these tasks by GSNN accelerator circuit 900. Local registers 922A, 922B, 922C, 922D may be used to store input values and results associated with executing these instructions. Program counters 924A, 924B, 924C, 924D may be used to load the address of next instruction to be executed by the corresponding processor. The input values may be retrieved from internal memory 912, and the results may also be written to internal memory 912.

To further improve efficiency and scalability of the neural network computation, filter circuit block 904 may further include one or more circuit stripes 932A-932H. Each of the circuit stripes 932A-932H may include identical circuit elements of filter circuits and a slice of internal memory assigned to the corresponding circuit stripe. Then, circuit stripes may be added to and subtracted from filter circuit block 904 without the need to change the principle of operations for filter circuit block 904. In one implementation, filter circuit block 904 may include eight circuit stripes 932A-932H. Each of the eight circuit stripes 932A-932H may include four filter circuits and one slice of internal memory. The circuit stripe 932A-932H may store an address to a memory slice 930A-930H that is assigned to the corresponding circuit stripe. Each one of the filter circuits may include circuit implementations of a N×N CNN filter, where N can be an integer value of 3 (or any suitable integer values)

An external processing device may assign tasks to any one of input circuit block 902, filter circuit block 904, post-processing circuit block 906, and output circuit block 908 by placing code segments including instructions in instruction memories 918A-918D to be executed by their respective processor 916A-916D. The instructions stored in different instruction memories may be specified according to their respective ISAs (e.g., input ISA, filter ISA, post-processing ISA, output ISA). The external processing device may use general-purpose registers 910 and external interface 914 to coordinate the execution of different tasks assigned to accelerator circuit 900. The external interface may include shadow registers 926, a control register ($ctrl), an error register ($err), a quality-of-service register ($QoS), and a next register ($next).

In one implementation, input circuit block 902, filter circuit block 904, post-processing circuit block 906, and output circuit block 908 may form an execution pipeline in the sense that the results from an earlier stage may be passed to the next stage. For example, input circuit block 902 may write results to the local register 922B of filter circuit block 904 as input values to filter circuit block 904; filter circuit block 904 may write results to register 922C of post-processing circuit block 906 as input values to post-processing circuit block 906; post-processing circuit block 906 may write results to register 922D of output circuit block 908 as input values to output circuit block 908. Further, the external processing device may use the next register ($next) to form an execution sequence of tasks and use general-purpose registers 910 to control the start of a particular task.

The following examples pertain to further embodiments. Example 1 of the implementation is an accelerator circuit comprising an internal memory to store data received from a memory associated with a processor, an input circuit block comprising an input processor to perform a first task comprising first instructions specified according to a first instruction architecture (ISA), a filter circuit block comprising a filter processor to perform a second task comprising second instructions specified according to a second ISA, and a post-processing circuit block comprising a post-processing processor to perform a third task comprising third instructions specified according to a third ISA, wherein at least two of the input processor, the filter processor, the post-filter processor, or the output processor performs their corresponding tasks concurrently.

In Example 2, the subject matter of Example 1 may further provide that the input circuit block further comprises a first instruction memory, a first data memory, and a first program counter (PC), wherein the first instruction memory is to store the first instructions, wherein the first PC is to store an address of a current first instruction to be executed by the first processor, and wherein the input processor is to execute the first instructions using first data stored in the first data memory to perform the first task, the filter circuit block further comprises a second instruction memory, a second data memory, and a second PC, wherein the second instruction memory is to store the second instructions, wherein the second PC is to store an address of a current second instruction to be executed by the second processor, and wherein the filter processor is to execute the second instructions using second data stored in the second data memory to perform the second task, the post-processing circuit block further comprises a third instruction memory, a third data memory, a third PC, wherein the third instruction memory is to store the third instructions, wherein the third PC is to store an address of a current third instruction to be executed by the third processor, and wherein the post-processing processor is to execute the third instructions using third data stored in the third data memory to perform the third task, and the output circuit block further comprises a fourth instruction memory, a fourth data memory, a fourth PC, wherein the fourth instruction memory is to store the fourth instructions, wherein the fourth PC is to store an address of a current fourth instruction to be executed by the fourth processor, and wherein the output processor is to execute the fourth instructions using fourth data stored in the fourth data memory to perform the fourth task, and wherein each of the input processor, the filter processor, the post-processing processor, or the output processor is a reduced instruction set computer (RISC) processor designed with a respective unique set of instructions.

In Example 3, the subject matter of Example 2 may further comprise wherein each of the input processor, the filter processor, the post-processing processor, or the output processor is a reduced instruction set computer (RISC) processor designed with a respective unique set of instructions, a plurality of shadow registers to store content to be copied to the plurality of general-purpose registers responsive to a copy event, and an interface circuit comprising a control register to store a plurality of interrupts to the processor, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory associated with the processor.

In Example 4, the subject matter of Example 2 may further provide that the filter circuit block further comprises a plurality of circuit stipes, each of the plurality of circuit stripes comprising a plurality of filter circuits, and a slice of the internal memory assigned to the plurality of filter circuits.

In Example 5, the subject matter of Example 2 may further provide that eight identical circuit stripes, wherein a circuit stripe of the eight identical circuit stripes comprises four three-by-three convolutional neural network (CNN) filter circuits, and a slice of the internal memory assigned to the four three-by-three CNN filter circuits.

In Example 6, the subject matter of Example 5 may further provide that the filter circuit block further comprises eight identical circuit stripes, wherein a circuit stripe of the eight identical circuit stripes comprises four three-by-three convolutional neural network (CNN) filter circuits, and a slice of the internal memory assigned to the four three-by-three CNN filter circuits.

In Example 7, the subject matter of Example 5 may further provide that one of the four three-by-three CNN filter circuits comprises a first plurality of registers to store weight parameters, a second plurality of registers to store input values, a reduce tree comprising a plurality of multiplication circuits to calculate a production between a respective one of the weight parameters and a respective one of the input values, and a sum circuit to add results from the plurality of multiplication circuits with a carry-over result from another one of the three-by-three CNN filter circuit.

In Example 8, the subject matter of Example 7 may further provide that the eight identical circuit stripes are each to output four results generated by the four three-by-three CNN filter circuits therein, and wherein the filter circuit block comprises four addition circuits, each of the four addition circuit is to sum a respective one of the four results from the eight filter circuits.

In Example 9, the subject matter of Example 1 may further provide that the input processor, the filter processor, the post-processing processor, and the output processor form a heterogeneous computing system, and wherein the first task further comprises a fifth instruction specified according to a common ISA, the second task further comprises a sixth instruction specified according to the common ISA, the third task further comprises a seventh instruction specified according to the common ISA, and the fourth task further comprises a seventh instruction specified according to the common ISA.

In Example 10, the subject matter of Example 1 may further provide that the internal memory comprises a plurality of memory slices and is addressable by a slice identifier to identify a memory slice and an offset with respect to a start position of the memory slice.

In Example 11, the subject matter of Example 1 may further provide that the internal memory comprises a plurality of sequentially-numbered arrays of bits, wherein each pair of an even-numbered array and a subsequent odd-numbered array form a corresponding memory bank, and wherein the internal memory is addressable by a memory bank identifier to identify a memory bank and a line identifier for a line in the memory bank.

In Example 12, the subject matter of Example 1 may further provide that the input circuit block, the filter circuit block, the post-processing circuit block, and the output circuit block form an execution pipeline, and wherein the input processor of the input circuit block is to read from the memory associated with the processor and to write a first result generated by the input circuit block to the internal memory, the filter processor is to read the first result from the internal memory and to write a second result generated by the filter circuit block to the internal memory, the post-processing processor is to read the second result from the internal memory and to write a third result generated by the post-processing circuit block to the internal memory, and the output processor is to read the third result from the internal memory and to write a fourth result generated by the output circuit block to the memory associated with the processor.

In Example 13, the subject matter of Example 1 may further provide that the post-processing circuit block is to perform at least one of a compaction function, an activation function, or a top-N function.

In Example 14, the subject matter of Example 13 may further provide that the compaction function is to have one of a 4 to 1, 3 to 1, 2 to 1, or 1 to 1 compaction ratio, and wherein an outcome of the compaction function is one of a first element of an input data comprising N elements or a maximum value of the input data comprising N elements, wherein N is an integer number greater than one.

In Example 15, the subject matter of Example 13 may further provide that the activation function is one of a step function, a sigmoid function, or a hyperbolic tangent function.

In Example 16, the subject matter of Example 13 may further provide that the top-N function is to determine N largest values and corresponding positions in an array of values.

In Example 17, the subject matter of Example 2 may further provide that the input processor is to read a data value from the memory associated with the processor, wherein the data value is one of a half-precision floating point, a signed byte, or an un-signed byte format, convert the data value to the half-precision floating point format, and write the data value to the internal memory.

In Example 18, the subject matter of Example 2 may further provide that the first instructions comprise an input instruction comprising a type value, a mode value, and a size value, and wherein to execute the input instruction, the input processor is to concatenate a first local register and a second local register of the input processor to form a first memory address, read, based on the first memory address, the memory associated with the processor to retrieve data values in a format determined by the type value, wherein the size value determines a number of bytes associated with the data values retrieved from the memory, and write the data values to the internal memory in a mode determined by the mode value.

In Example 19, the subject matter of Example 18 may further provide that responsive to determining that the mode value indicates a first mode, the input processor is to write, based on a second memory address stored in a third local register, to the internal memory, and responsive to determining that the mode value indicates a second mode, the input processor is to write in the slice in each of the plurality of circuit stripes with an offset stored in the third local register.

In Example 20, the subject matter of Example 18 may further provide that the type value, the mode value, and the size value are one of immediate values or stored in a target register of the input instruction.

In Example 21, the subject matter of Example 4 may further provide that the second instructions comprise a filter instruction comprising a sum value and a mode value, and wherein to execute the filter instruction, the filter processor is to read data values from the internal memory based on a first memory address stored in a first local register of the filter processor, for each circuit stripe: load the data values in weight registers and input registers associated with the plurality of filter circuits of the circuit stripe to generate a plurality of filter results, calculate, based on the sum value, sum values of corresponding filter results from each circuit stripe, determine, based on the mode value, whether the filter circuit block is in a slice mode or in a global mode, responsive to determining that the filter circuit block is in the slice mode, write the sum values to each slice with an offset stored in a second local register, and responsive to determining that the filter circuit block is in a global mode, write the sum values to the internal memory at a memory address stored in the second local register.

In Example 22, the subject matter of Example 21 may further provide that the mode value and the sum value are one of immediate values or stored in a target register of the filter instruction.

In Example 23, the subject matter of Example 2 may further provide that the third instructions comprise a post-processing instruction comprising an identifier of the control register, a column value, a row value, and a kind value, wherein to execute the post-processing instruction, the post-processing processor is to responsive to determining that the kind value indicates a compaction mode, read, based on a first memory address stored in a first local register, a number of data values from the internal memory, wherein the column value specifies the number, group, based on the column value, the data values into a plurality of groups, compact, based on the kind value, each of the plurality of groups into one of a maximum value of the group or a first element of the group, determine a maximum value among the compacted values and a value stored in a stage register, store the maximum value in the state register, apply an activation function to the maximum value, wherein the activation function is one of an identity function, a step function, a sigmoid function, or a hyperbolic tangent function, and write, based on a second memory address stored in a second local register, a result of the activation function to the internal memory, and responsive to determining that the kind value indicates a top-N mode, read, based on a third memory address stored in a third local register, an array of data values, determine a top-N values and their corresponding positions in the array, wherein N is an integer greater than 1, responsive to determining that the control value indicates a memory write, write the top-N values and their corresponding positions in the internal memory at a fourth memory address stored in a fourth local register, and responsive to determining that the control value indicates a register write, write the top-N values and their corresponding positions in state registers associated with the post-processing processor.

In Example 24, the subject matter of Example 23 may further provide that the identifier of the control register, the column value, the row value, and the kind value are one of immediate values or stored in a target register of the post-processing instruction.

In Example 25, the subject matter of Example 2 may further provide that the fourth instructions comprise an output instruction comprising a type value, a mode value, and a size value, and wherein to execute the output instruction, the output processor is to read a plurality of data values from the internal memory based on a first memory address stored in a first local register of the output processor, wherein the size value specifies a number of the plurality of data values, concatenate a second local register and a third local register of the output processor to form a second memory address, and write the plurality of data values to the memory associated with the processor based on the second memory address in a format determined by the type value.

In Example 26, the subject matter of Example 25 may further provide that the type value, the mode value, and the size value are one of immediate values or stored in a target register of the input instruction.

In Example 27, the subject matter of Example 1 may further provide that each of the input circuit block, the filter circuit block, the post-processing circuit block, and the output circuit block comprises a distinct RISC hardware processor.

In Example 28, the subject matter of Example 1 may further provide that at least two but fewer than four of the input circuit block, the filter circuit block, the post-processing circuit block, and the output circuit block share a common RISC hardware processor.

Example 29 is a system comprising a memory, a processor to execute a neural network application comprising a first task for inputting data, a second task for filtering the data, a third task for post-processing the data, and a fourth task for outputting the data, and an accelerator circuit, communicatively coupled to the memory and the processor, the accelerator circuit comprising an internal memory to store data received from the memory, an input circuit block comprising an input processor to perform the first task comprising first instructions specified according to a first instruction architecture (ISA), a filter circuit block comprising a filter processor to perform the second task comprising second instructions specified according to a second ISA, a post-processing circuit block comprising a post-processing processor to perform the third task comprising third instructions specified according to a third ISA, and an output circuit block comprising an output processor to perform the fourth task comprising fourth instructions specified according to a fourth ISA, wherein at least two of the input processor, the filter processor, the post-filter processor, or the output processor performs their corresponding tasks concurrently.

In Example 30, the subject matter of Example 29 may further provide that the accelerator circuit further comprises the input circuit block further comprises a first instruction memory, a first data memory, and a first program counter (PC), wherein the first instruction memory is to store the first instructions, wherein the first PC is to store an address of a current first instruction to be executed by the first processor, and wherein the input processor is to execute the first instructions using first data stored in the first data memory to perform the first task, the filter circuit block further comprises a second instruction memory, a second data memory, and a second PC, wherein the second instruction memory is to store the second instructions, wherein the second PC is to store an address of a current second instruction to be executed by the second processor, and wherein the filter processor is to execute the second instructions using second data stored in the second data memory to perform the second task, the post-processing circuit block further comprises a third instruction memory, a third data memory, a third PC, wherein the third instruction memory is to store the third instructions, wherein the third PC is to store an address of a current third instruction to be executed by the third processor, and wherein the post-processing processor is to execute the third instructions using third data stored in the third data memory to perform the third task, and the output circuit block further comprises a fourth instruction memory, a fourth data memory, a fourth PC, wherein the fourth instruction memory is to store the fourth instructions, wherein the fourth PC is to store an address of a current fourth instruction to be executed by the fourth processor, and wherein the output processor is to execute the fourth instructions using fourth data stored in the fourth data memory to perform the fourth task, wherein each of the input processor, the filter processor, the post-processing processor, or the output processor is a reduced instruction set computer (RISC) processor designed with a respective unique set of instructions.

In Example 31, the subject matter of Example 30 may further provide that the accelerator circuit further comprises a plurality of general-purpose registers to store a first flag bit indicating a start of execution of at least one of the first task, the second task, the third task, or the fourth task, a plurality of shadow registers to store content to be copied to the plurality of general-purpose registers responsive to a copy event, and an interface circuit comprising a control register to store a plurality of interrupts to the processor, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory associated with the processor.

In Example 32, the subject matter of Example 30 may further provide that the accelerator circuit further comprises a plurality of circuit stipes, each of the plurality of circuit stripes comprising a plurality of filter circuits, and a slice of the internal memory assigned to the plurality of filter circuits.

In Example 33, the subject matter of Example 30 may further provide that the filter circuit block further comprises eight identical circuit stripes, wherein a circuit stripe of the eight identical circuit stripes comprises four three-by-three convolutional neural network (CNN) filter circuits, and a slice of the internal memory assigned to the four three-by-three CNN filter circuits.

In Example 34, the subject matter of Example 33 may further provide that the circuit stripe of the eight identical circuit stripes comprises the four three-by-three CNN filter circuits that share a first plurality of registers to store common weight parameters of the four three-by-three CNN filter circuits.

In Example 35, the subject matter of Example 29 may further provide that the first instructions comprise an input instruction comprising a type value, a mode value, and a size value, and wherein to execute the input instruction, the input processor is to concatenate a first local register and a second local register of the input processor to form a first memory address, read, based on the first memory address, the memory associated with the processor to retrieve data values in a format determined by the type value, wherein the size value determines a number of bytes of the data values retrieved from the memory, and write to the internal memory in a mode determined by the mode value.

In Example 36, the subject matter of Example 29 may further provide that the second instructions comprise a filter instruction comprising a sum value and a mode value, and wherein to execute the filter instruction, the filter processor is to read data values from the internal memory based on a first memory address stored in a first local register of the filter processor, for each circuit stripe: load the data values in weight registers and input registers associated with the plurality of filter circuits of the circuit stripe to generate a plurality of filter results, calculate, based on the sum value, sum values of corresponding filter results from each circuit stripe, determine, based on the mode value, whether the filter circuit block is in a slice mode or in a global mode, responsive to determining that the filter circuit block is in the slice mode, write the sum values to each slice with an offset stored in a second local register, and responsive to determining that the filter circuit block is in a global mode, write the sum values to the internal memory at a memory address stored in the second local register.

In Example 37, the subject matter of Example 29 may further provide that the third instructions comprise a post-processing instruction comprising an identifier of the control register, a column value, a row value, and a kind value, wherein to execute the post-processing instruction, the post-processing processor is to responsive to determining that the kind value indicates a compaction mode, read, based on a first memory address stored in a first local register, a number of data values from the internal memory, wherein the column value specifies the number, group, based on the column value, the data values into a plurality of groups, compact, based on the kind value, each of the plurality of groups into one of a maximum value of the group or a first element of the group, determine a maximum value among the compacted values and a value stored in a stage register, store the maximum value in the state register, apply an activation function to the maximum value, wherein the activation function is one of an identity function, a step function, a sigmoid function, or a hyperbolic tangent function, and write, based on a second memory address stored in a second local register, a result of the activation function to the internal memory, and responsive to determining that the kind value indicates a top-N mode, read, based on a third memory address stored in a third local register, an array of data values, determine a top-N values and their corresponding positions in the array, wherein N is an integer greater than 1, responsive to determining that the control value indicates a memory write, write the top-N values and their corresponding positions in the internal memory at a fourth memory address stored in a fourth local register, and responsive to determining that the control value indicates a register write, write the top-N values and their corresponding positions in state registers associated with the post-processing processor.

In Example 38, the subject matter of Example 29 may further provide that the fourth instructions comprise an output instruction comprising a type value, a mode value, and a size value, and wherein to execute the output instruction, the output processor is to read a plurality of data values from the internal memory based on a first memory address stored in a first local register of the output processor, wherein the size value specifies a number of the plurality of data values, concatenate a second local register and a third local register of the output processor to form a second memory address, and write the plurality of data values to the memory associated with the processor based on the second memory address in a format determined by the type value.

Example 39 is a system comprising a memory, an accelerator circuit comprising an input circuit block, a filter circuit block, a post-processing circuit block, and an output circuit block, and a processor, communicatively coupled to the memory and the accelerator circuit, to initialize the accelerator circuit, determining tasks of a neural network application to be performed by at least one of the input circuit block, the filter circuit block, the post-processing circuit block, or the output circuit block, determining tasks of a neural network application to be performed by at least one of the input circuit block, the filter circuit block, the post-processing circuit block, or the output circuit block, instruct the accelerator circuit to perform the tasks, and execute the neural network application based on results received from the accelerator circuit completing performance of the tasks.

In Example 40, the subject matter of Example 39 may further provide that the accelerator circuit further comprises an internal memory to store data received from the memory, a plurality of general-purpose registers to store a first flag bit indicating a start of execution of at least one of the tasks, a plurality of shadow registers to store content to be copied to the plurality of general-purpose registers responsive to a copy event, and an interface circuit comprising a control register to store a plurality of interrupts to the processor, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory associated with the processor.

In Example 41, the subject matter of Example 40 may further provide that the input circuit block further comprises an input processor, a first instruction memory, a first data memory, and a first program counter (PC), wherein the first instruction memory is to store first instructions of a first task specified according to a first instruction set architecture (ISA) of the input processor, wherein the first PC is to store an address of a current first instruction to be executed by the first processor, and wherein the input processor is to execute the first instructions using first data stored in the first data memory to perform the first task, the filter circuit block comprising a filter processor, a second instruction memory, a second data memory, and a second PC, wherein the second instruction memory is to store second instructions of a second task specified according to a second ISA of the filter processor, wherein the second PC is to store an address of a current second instruction to be executed by the second processor, and wherein the filter processor is to execute the second instructions using second data stored in the second data memory to perform the second task, the post-processing circuit block comprising a post-processing processor, a third instruction memory, a third data memory, a third PC, wherein the third instruction memory is to store third instructions of a third task specified according to a third ISA of the post-processing processor, wherein the third PC is to store an address of a current third instruction to be executed by the third processor, and wherein the post-processing processor is to execute the third instructions using third data stored in the third data memory to perform the third task, and the output circuit block comprising an output processor, a fourth instruction memory, a fourth data memory, a fourth PC, wherein the fourth instruction memory is to store fourth instructions of a fourth task specified according to a fourth ISA of the output processor, wherein the fourth PC is to store an address of a current fourth instruction to be executed by the fourth processor, and wherein the output processor is to execute the fourth instructions using fourth data stored in the fourth data memory to perform the fourth task.

In Example 42, the subject matter of Example 41 may further provide that a plurality of circuit stipes, each of the plurality of circuit stripes comprising a plurality of filter circuits, and a slice of the internal memory assigned to the plurality of filter circuits.

In Example 43, the subject matter of Example 41 may further provide that the filter circuit block further comprises eight identical circuit stripes, wherein a circuit stripe of the eight identical circuit stripes comprises four three-by-three convolutional neural network (CNN) filter circuits, and a slice of the internal memory assigned to the four three-by-three CNN filter circuits.

In Example 44, the subject matter of Example 41 may further provide that at least two of the input circuit block, the filter circuit block, the post-processing circuit block, and the output circuit block are to operate concurrently.

In Example 45, the subject matter of Example 41 may further provide that the first instructions comprise an input instruction comprising a type value, a mode value, and a size value, and wherein to execute the input instruction, the input processor is to concatenate a first local register and a second local register of the input processor to form a first memory address, read, based on the first memory address, the memory associated with the processor to retrieve data values in a format determined by the type value, wherein the size value determines a number of bytes associated with the data values retrieved from the memory, and write the data values to the local memory in a mode determined by the mode value.

In Example 46, the subject matter of Example 45 may further provide that responsive to determining that the mode value indicates a first mode, the input processor is to write, based on a second memory address stored in a third local register, to the local memory, and responsive to determining that the mode value indicates a second mode, the input processor is to write in the slice in each of the plurality of circuit stripes with an offset stored in the third local register.

In Example 47, the subject matter of Example 41 may further provide that the second instructions comprise a filter instruction comprising a sum value and a mode value, and wherein to execute the filter instruction, the filter processor is to read data values from the internal memory based on a first memory address stored in a first local register of the filter processor, for each circuit stripe: load the data values in weight registers and input registers associated with the plurality of filter circuits of the circuit stripe to generate a plurality of filter results, calculate, based on the sum value, sum values of corresponding filter results from each circuit stripe, determine, based on the mode value, whether the filter circuit block is in a slice mode or in a global mode, responsive to determining that the filter circuit block is in the slice mode, write the sum values to each slice with an offset stored in a second local register, and responsive to determining that the filter circuit block is in a global mode, write the sum values to the internal memory at a memory address stored in the second local register.

In Example 48, the subject matter of Example 41 may further provide that the third instructions comprise a post-processing instruction comprising an identifier of the control register, a column value, a row value, and a kind value, wherein to execute the post-processing instruction, the post-processing processor is to responsive to determining that the kind value indicates a compaction mode, read, based on a first memory address stored in a first local register, a number of data values from the internal memory, wherein the column value specifies the number, group, based on the column value, the data values into a plurality of groups, compact, based on the kind value, each of the plurality of groups into one of a maximum value of the group or a first element of the group, determine a maximum value among the compacted values and a value stored in a stage register, store the maximum value in the state register, apply an activation function to the maximum value, wherein the activation function is one of an identity function, a step function, a sigmoid function, or a hyperbolic tangent function, and write, based on a second memory address stored in a second local register, a result of the activation function to the internal memory, and responsive to determining that the kind value indicates a top-N mode, read, based on a third memory address stored in a third local register, an array of data values, determine a top-N values and their corresponding positions in the array, wherein N is an integer greater than 1, responsive to determining that the control value indicates a memory write, write the top-N values and their corresponding positions in the internal memory at a fourth memory address stored in a fourth local register, and responsive to determining that the control value indicates a register write, write the top-N values and their corresponding positions in state registers associated with the post-processing processor.

In Example 49, the subject matter of Example 41 may further provide that the fourth instructions comprise an output instruction comprising a type value, a mode value, and a size value, and wherein to execute the output instruction, the output processor is to read a plurality of data values from the internal memory based on a first memory address stored in a first local register of the output processor, wherein the size value specifies a number of the plurality of data values, concatenate a second local register and a third local register of the output processor to form a second memory address, and write the plurality of data values to the memory associated with the processor based on the second memory address in a format determined by the type value.

In Example 50, the subject matter of Example 41 may further provide that to initialize the accelerator circuit, the processor is to set a reset flag in the control register.

In Example 51, the subject matter of Example 41 may further provide that to determine the tasks of the neural network application, the processor is to partition the neural network application into code segments to be executed by one of the input processor, the filter processor, the post-processing processor, or the output processor.

In Example 52, the subject matter of Example 39 may further provide that to assign each of the tasks to the corresponding one of the input circuit block, the filter circuit block, the post-processing circuit block, or the output circuit block, the processor is to place instructions of the tasks in the corresponding first instruction memory, second instruction memory, third instruction memory, or fourth instruction memory.

Example 53 is a method comprising initiating, by a processor, an accelerator circuit comprising an input circuit block, a filter circuit block, a post-processing circuit block, and an output circuit block, determining tasks of a neural network application to be performed by at least one of the input circuit block, the filter circuit block, the post-processing circuit block, or the output circuit block, assigning each of the tasks to a corresponding one of the input circuit block, the filter circuit block, the post-processing circuit block, or the output circuit block, instructing the accelerator circuit to perform the tasks, and executing the neural network application based on results received from the accelerator circuit completing performance of the tasks.

Example 54 is an accelerator circuit comprising an internal memory to store data received a memory associated with a processor, and a filter circuit block comprising a plurality of circuit stripes, each circuit stripe comprising a filter processor, a plurality of filter circuits, and a slice of internal memory assigned to the plurality of filter circuits, wherein the filter processor is to execute a filter instruction, to read data values from the internal memory based on a first memory address, for each of the plurality of circuit stripes: load the data values in weight registers and input registers associated with the plurality of filter circuits of the circuit stripe to generate a plurality of filter results, and write a result generated using the plurality of filter circuits in the internal memory at a second memory address.

In Example 55, the subject matter of Example 54 may further comprise an input circuit block further comprises an input processor, a first instruction memory, a first data memory, and a first program counter (PC), wherein the first instruction memory is to store first instructions of a first task specified according to a first instruction set architecture (ISA) of the input processor, wherein the first PC is to store an address of a current first instruction to be executed by the first processor, and wherein the input processor is to execute the first instructions using first data stored in the first data memory to perform the first task, the filter circuit block comprising a second instruction memory, a second data memory, and a second PC, wherein the second instruction memory is to store second instructions of a second task specified according to a second ISA of the filter processor, wherein the second PC is to store an address of a current second instruction to be executed by the second processor, and wherein the filter processor is to execute the second instructions using second data stored in the second data memory to perform the second task, a post-processing circuit block comprising a post-processing processor, a third instruction memory, a third data memory, a third PC, wherein the third instruction memory is to store third instructions of a third task specified according to a third ISA of the post-processing processor, wherein the third PC is to store an address of a current third instruction to be executed by the third processor, and wherein the post-processing processor is to execute the third instructions using third data stored in the third data memory to perform the third task, and an output circuit block comprising an output processor, a fourth instruction memory, a fourth data memory, a fourth PC, wherein the fourth instruction memory is to store fourth instructions of a fourth task specified according to a fourth ISA of the output processor, wherein the fourth PC is to store an address of a current fourth instruction to be executed by the fourth processor, and wherein the output processor is to execute the fourth instructions using fourth data stored in the fourth data memory to perform the fourth task.

In Example 56, the subject matter of Example 55 may further comprise a plurality of general-purpose registers to store a first flag bit indicating a start of execution of at least one of the tasks, a plurality of shadow registers to store content to be copied to the plurality of general-purpose registers responsive to a copy event, and an interface circuit comprising a control register to store a plurality of interrupts to the processor, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory associated with the processor.

In Example 57, the subject matter of Example 56 may further provide that the filter circuit block comprises eight identical circuit stripes, wherein a circuit stripe of the eight identical circuit stripes comprises four three-by-three convolutional neural network (CNN) filter circuits, and a slice of the internal memory assigned to the four three-by-three CNN filter circuits.

In Example 58, the subject matter of Example 57 may further provide that the circuit stripe of the eight identical circuit stripes comprises the four three-by-three CNN filter circuits that share a first plurality of registers to store common weight parameters of the four three-by-three CNN filter circuits.

In Example 59, the subject matter of Example 57 may further provide that one of the four three-by-three CNN filter circuits comprises a first plurality of registers to store weight parameters, a second plurality of registers to store input values, a reduce tree comprising a plurality of multiplication circuits to calculate a production between a respective one of the weight parameters and a respective one of the input values, and a sum circuit to add results from the plurality of multiplication circuits with a carry-over result from another one of the three-by-three CNN filter circuit.

In Example 60, the subject matter of Example 59 may further provide that the eight identical circuit stripes are each to output four results generated by the four three-by-three CNN filter circuits therein, and wherein the filter circuit block comprises four addition circuits, each of the four addition circuit is to sum a respective one of the four results from the eight filter circuits.

In Example 61, the subject matter of Example 59 may further provide that the input circuit block, the filter circuit block, the post-processing circuit block, and the output circuit block form an execution pipeline, and wherein the input processor of the input circuit block is to read from the memory associated with the processor and to write a first result generated by the input circuit block to the internal memory, the filter processor is to read the first result from the internal memory and to write a second result generated by the filter circuit block to the internal memory, the post-processing processor is to read the second result from the internal memory and to write a third result generated by the post-processing circuit block to the internal memory, and the output processor is to read the third result from the internal memory and to write a fourth result generated by the output circuit block to the memory associated with the processor.

In Example 62, the subject matter of Example 59 may further provide that at least two of the input circuit block, the filter circuit block, the post-processing circuit block, and the output circuit block are to operate concurrently.

In Example 63, the subject matter of Example 59 may further provide that the post-processing circuit block is to perform at least one of a compaction function, an activation function, or a top-N function.

In Example 64, the subject matter of Example 59 may further provide that the first instructions comprise an input instruction comprising a type value, a mode value, and a size value, and wherein to execute the input instruction, the input processor is to concatenate a first local register and a second local register of the input processor to form a first memory address, read, based on the first memory address, the memory associated with the processor to retrieve data values in a format determined by the type value, wherein the size value determines a number of bytes associated with the data values retrieved from the memory, and write the data values to the local memory in a mode determined by the mode value.

In Example 65, the subject matter of Example 59 may further provide that the second instructions comprise a filter instruction comprising a sum value and a mode value, and wherein to execute the filter instruction, the filter processor is to read data values from the internal memory based on a first memory address stored in a first local register of the filter processor, for each circuit stripe: load the data values in weight registers and input registers associated with the plurality of filter circuits of the circuit stripe to generate a plurality of filter results, calculate, based on the sum value, sum values of corresponding filter results from each circuit stripe, determine, based on the mode value, whether the filter circuit block is in a slice mode or in a global mode, responsive to determining that the filter circuit block is in the slice mode, write the sum values to each slice with an offset stored in a second local register, and responsive to determining that the filter circuit block is in a global mode, write the sum values to the internal memory at a memory address stored in the second local register.

In Example 66, the subject matter of Example 59 may further provide that the third instructions comprise a post-processing instruction comprising an identifier of the control register, a column value, a row value, and a kind value, wherein to execute the post-processing instruction, the post-processing processor is to responsive to determining that the kind value indicates a compaction mode, read, based on a first memory address stored in a first local register, a number of data values from the internal memory, wherein the column value specifies the number, group, based on the column value, the data values into a plurality of groups, compact, based on the kind value, each of the plurality of groups into one of a maximum value of the group or a first element of the group, determine a maximum value among the compacted values and a value stored in a stage register, store the maximum value in the state register, apply an activation function to the maximum value, wherein the activation function is one of an identity function, a step function, a sigmoid function, or a hyperbolic tangent function, and write, based on a second memory address stored in a second local register, a result of the activation function to the internal memory, and responsive to determining that the kind value indicates a top-N mode, read, based on a third memory address stored in a third local register, an array of data values, determine a top-N values and their corresponding positions in the array, wherein N is an integer greater than 1, responsive to determining that the control value indicates a memory write, write the top-N values and their corresponding positions in the internal memory at a fourth memory address stored in a fourth local register, and responsive to determining that the control value indicates a register write, write the top-N values and their corresponding positions in state registers associated with the post-processing processor.

In Example 67, the subject matter of Example 59 may further provide that the fourth instructions comprise an output instruction comprising a type value, a mode value, and a size value, and wherein to execute the output instruction, the output processor is to read a plurality of data values from the internal memory based on a first memory address stored in a first local register of the output processor, wherein the size value specifies a number of the plurality of data values, concatenate a second local register and a third local register of the output processor to form a second memory address, and write the plurality of data values to the memory associated with the processor based on the second memory address in a format determined by the type value.

Example 68 is a system comprising a memory to store data, a processor, communicatively coupled to the memory, to execute a neural network application comprising filter operations using the data, and an accelerator circuit comprising an internal memory, a filter circuit block comprising a plurality of circuit stripes, each circuit stripe comprising a filter processor, a plurality of filter circuits, and a slice of the internal memory assigned to the plurality of filter circuits, wherein the filter processor is to execute a filter instruction, to read data values from the internal memory based on a first memory address, for each circuit stripe: load the data values in weight registers and input registers associated with the plurality of filter circuits of the circuit stripe to generate a plurality of filter results, and write a result generated using the plurality of filter circuits in the internal memory at a second memory address.

Example 69 is a method comprising receiving, by an accelerator circuit, a task comprising a filter instruction from a processor, wherein the accelerator circuit comprising a filter circuit block comprising a plurality of circuit stripes, each circuit stripe comprising a filter engine, a plurality of filter circuits, and a slice of an internal memory assigned to the plurality of filter circuits, reading data values from the internal memory of the accelerator circuit starting from a first memory address, for each of the plurality of circuit stripes, loading the data values in weight registers and input registers associated with a plurality of filter circuits to generate a plurality of filter results, and writing a result generated using the plurality of filter circuits in the internal memory at a second memory address.

Example 70 is a system comprising a memory to store data, a processor, communicatively coupled to the memory, to execute a neural network application, and an accelerator circuit comprising an input circuit block comprising an input processor to perform first tasks of the neural network application, a filter circuit block comprising a filter processor to perform second tasks of the neural network application, and a plurality of general-purpose registers communicatively coupled to the input circuit block, the filter circuit block, the post-processing circuit block, and the ou910tput circuit block, wherein the input circuit block and the filter circuit block form stages of an execution pipeline, wherein a producer stage is to supply data values to a consumer stage, and wherein operation of the consumer stage is on hold until a start flag stored in a first general-purpose register of the plurality of general-purpose registers is set by the producer.

In Example 71, the subject matter of Example 68 may further provide that the accelerator circuit further comprises a post-processing circuit block comprising a post-processing processor to perform third tasks of the neural network application, and an output circuit block comprising an output processor to perform fourth tasks of the neural network, wherein the input circuit block, the filter circuit block form stages of an execution pipeline, the post-processing circuit block, and the output circuit block form the execution pipeline.

In Example 73, the subject matter of Example 71 may further provide that the producer stage is the input circuit block, and the consumer stage is one of the filter circuit block, the post-processing circuit block, or the output circuit block, wherein the producer stage is one of the input circuit block or the filter circuit block, and the consumer stage is one of the post-processing circuit block or the output circuit block, and wherein the producer stage is one of the input circuit block, the filter circuit block, or the post-processing stage, and the consumer stage is the output circuit block.

In Example 73, the subject matter of Example 70 may further provide that the input circuit block further comprises a first instruction memory, a first data memory, and a first program counter (PC), wherein the first instruction memory is to store first instructions of a first task specified according to a first instruction set architecture (ISA) of the input processor, wherein the first PC is to store an address of a current first instruction to be executed by the first processor, and wherein the input processor is to execute the first instructions using first data stored in the first data memory to perform the first task, the filter circuit block further comprises a second instruction memory, a second data memory, and a second PC, wherein the second instruction memory is to store second instructions of a second task specified according to a second ISA of the filter processor, wherein the second PC is to store an address of a current second instruction to be executed by the second processor, and wherein the filter processor is to execute the second instructions using second data stored in the second data memory to perform the second task, the post-processing circuit block further comprises a third instruction memory, a third data memory, a third PC, wherein the third instruction memory is to store third instructions of a third task specified according to a third ISA of the post-processing processor, wherein the third PC is to store an address of a current third instruction to be executed by the third processor, and wherein the post-processing processor is to execute the third instructions using third data stored in the third data memory to perform the third task, and the output circuit block further comprises a fourth instruction memory, a fourth data memory, a fourth PC, wherein the fourth instruction memory is to store fourth instructions of a fourth task specified according to a fourth ISA of the output processor, wherein the fourth PC is to store an address of a current fourth instruction to be executed by the fourth processor, and wherein the output processor is to execute the fourth instructions using fourth data stored in the fourth data memory to perform the fourth task.

In Example 74, the subject matter of Example 73 may further provide that the accelerator circuit further comprises a plurality of shadow registers to store content to be copied to the plurality of general-purpose registers responsive to a copy event, and an interface circuit comprising a control register to store a plurality of interrupts to the processor, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory associated with the processor.

In Example 75, the subject matter of Example 73 may further provide that the input processor of the input circuit block is to read from the memory associated with the processor and to write a first result generated by the input circuit block to the internal memory, the filter processor is to read the first result from the internal memory and to write a second result generated by the filter circuit block to the internal memory, the post-processing processor is to read the second result from the internal memory and to write a third result generated by the post-processing circuit block to the internal memory, and the output processor is to read the third result from the internal memory and to write a fourth result generated by the output circuit block to the memory associated with the processor.

In Example 76, the subject matter of Example 73 may further provide that at least two of the input circuit block, the filter circuit block, the post-processing circuit block, and the output circuit block are to operate concurrently.

In Example 77, the subject matter of Example 73 may further provide that the first instructions comprise an input instruction comprising a type value, a mode value, and a size value, and wherein to execute the input instruction, the input processor is to concatenate a first local register and a second local register of the input processor to form a first memory address, read, based on the first memory address, the memory associated with the processor to retrieve data values in a format determined by the type value, wherein the size value determines a number of bytes associated with the data values retrieved from the memory, and write the data values to the local memory in a mode determined by the mode value.

In Example 78, the subject matter of Example 77 may further provide that responsive to determining that the mode value indicates a first mode, the input processor is to write, based on a second memory address stored in a third local register, to the local memory, and responsive to determining that the mode value indicates a second mode, the input processor is to write in the slice in each of the plurality of circuit stripes with an offset stored in the third local register.

In Example 79, the subject matter of Example 73 may further provide that the second instructions comprise a filter instruction comprising a sum value and a mode value, and wherein to execute the filter instruction, the filter processor is to read data values from the internal memory based on a first memory address stored in a first local register of the filter processor, for each circuit stripe: load the data values in weight registers and input registers associated with the plurality of filter circuits of the circuit stripe to generate a plurality of filter results, calculate, based on the sum value, sum values of corresponding filter results from each circuit stripe, determine, based on the mode value, whether the filter circuit block is in a slice mode or in a global mode, responsive to determining that the filter circuit block is in the slice mode, write the sum values to each slice with an offset stored in a second local register, and responsive to determining that the filter circuit block is in a global mode, write the sum values to the internal memory at a memory address stored in the second local register.

In Example 80, the subject matter of Example 73 may further provide that the third instructions comprise a post-processing instruction comprising an identifier of the control register, a column value, a row value, and a kind value, wherein to execute the post-processing instruction, the post-processing processor is to responsive to determining that the kind value indicates a compaction mode, read, based on a first memory address stored in a first local register, a number of data values from the internal memory, wherein the column value specifies the number, group, based on the column value, the data values into a plurality of groups, compact, based on the kind value, each of the plurality of groups into one of a maximum value of the group or a first element of the group, determine a maximum value among the compacted values and a value stored in a stage register, store the maximum value in the state register, apply an activation function to the maximum value, wherein the activation function is one of an identity function, a step function, a sigmoid function, or a hyperbolic tangent function, and responsive to determining that the kind value indicates a top-N mode, read, based on a third memory address stored in a third local register, an array of data values, determine a top-N values and their corresponding positions in the array, wherein N is an integer greater than 1, responsive to determining that the control value indicates a memory write, write the top-N values and their corresponding positions in the internal memory at a fourth memory address stored in a fourth local register, and responsive to determining that the control value indicates a register write, write the top-N values and their corresponding positions in state registers associated with the post-processing processor.

In Example 81, the subject matter of Example 73 may further provide that the fourth instructions comprise an output instruction comprising a type value, a mode value, and a size value, and wherein to execute the output instruction, the output processor is to read a plurality of data values from the internal memory based on a first memory address stored in a first local register of the output processor, wherein the size value specifies a number of the plurality of data values, concatenate a second local register and a third local register of the output processor to form a second memory address, and write the plurality of data values to the memory associated with the processor based on the second memory address in a format determined by the type value.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system, comprising:

a memory to store data;

a processor, communicatively coupled to the memory, to execute a neural network application; and an accelerator circuit comprising:

an input circuit block comprising an input processor to perform a first task of the neural network application;

a filter circuit block comprising a filter processor to perform a second task of the neural network application;

a post-processing circuit block comprising a post-processing processor to perform a third task of the neural network application;

an output circuit block comprising an output processor to perform a fourth task of the neural network application; and a plurality of general-purpose registers communicatively coupled to the input circuit block and the filter circuit block, wherein a producer stage is to supply data values to a consumer stage, and wherein operation of the consumer stage is on hold until a start flag stored in a first general-purpose register of the plurality of general-purpose registers is set by the producer stage, wherein the input circuit block, the filter circuit block, the post-processing circuit block, and the output circuit block form an execution pipeline, wherein the input circuit block further comprises a first instruction memory, a first data memory, and a first program counter (PC), wherein the first instruction memory is to store first instructions of the first task specified according to a first instruction set architecture (ISA) of the input processor, wherein the first PC is to store an address of a current first instruction to be executed by a first processor, and wherein the input processor is to execute the first instructions using first data stored in the first data memory to perform the first task, wherein the filter circuit block further comprises a second instruction memory, a second data memory, and a second PC, wherein the second instruction memory is to store second instructions of the second task specified according to a second ISA of the filter processor, wherein the second PC is to store an address of a current second instruction to be executed by a second processor, and wherein the filter processor is to execute the second instructions using second data stored in the second data memory to perform the second task, wherein the post-processing circuit block further comprises a third instruction memory, a third data memory, and a third PC, wherein the third instruction memory is to store third instructions of the third task specified according to a third ISA of the post-processing processor, wherein the third PC is to store an address of a current third instruction to be executed by a third processor, and wherein the post-processing processor is to execute the third instructions using third data stored in the third data memory to perform the third task; and wherein the output circuit block further comprises a fourth instruction memory, a fourth data memory, and a fourth PC, wherein the fourth instruction memory is to store fourth instructions of the fourth task specified according to a fourth ISA of the output processor, wherein the fourth PC is to store an address of a current fourth instruction to be executed by a fourth processor, and wherein the output processor is to execute the fourth instructions using fourth data stored in the fourth data memory to perform the fourth task.

2. The system of claim 1, wherein the producer stage is the input circuit block, and the consumer stage is one of the filter circuit block, the post-processing circuit block, and the output circuit block, wherein the producer stage is one of the input circuit block and the filter circuit block, and the consumer stage is one of the post-processing circuit block and the output circuit block, or wherein the producer stage is one of the input circuit block, the filter circuit block, and the post-processing circuit block, and the consumer stage is the output circuit block.

3. The system of claim 1, wherein the accelerator circuit further comprises:

a plurality of shadow registers to store content to be copied to the plurality of general-purpose registers responsive to a copy event; and an interface circuit comprising:

a control register to store a plurality of interrupts to the processor communicatively coupled to the memory, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory communicatively coupled to the processor.

4. The system of claim 1, wherein the input processor of the input circuit block is to read from the memory communicatively coupled to the processor and to write a first result generated by the input circuit block to an internal memory, the filter processor is to read the first result from the internal memory and to write a second result generated by the filter circuit block to the internal memory, the post-processing processor is to read the second result from the internal memory and to write a third result generated by the post-processing circuit block to the internal memory, and the output processor is to read the third result from the internal memory and to write a fourth result generated by the output circuit block to the memory communicatively coupled to the processor.

5. The system of claim 4, wherein the second instructions comprise a filter instruction comprising a sum value and a mode value, and wherein to execute the filter instruction, the filter processor is to:

read the data values from the internal memory based on a first memory address stored in a first local register of the filter processor;

for each circuit stripe: load the data values in weight registers and input registers associated with a plurality of filter circuits of the circuit stripe to generate a plurality of filter results;

calculate, based on the sum value, sum values of corresponding filter results from each circuit stripe;

determine, based on the mode value, whether the filter circuit block is in a slice mode or in a global mode;

responsive to determining that the filter circuit block is in the slice mode, write the sum values of corresponding filter results to each slice with an offset stored in a second local register; and responsive to determining that the filter circuit block is in the global mode, write the sum values of corresponding filter results to the internal memory at a memory address stored in the second local register.

6. The system of claim 4 wherein the third instructions comprise a post-processing instruction comprising an identifier of a control register, a column value, a row value, and a kind value, wherein to execute the post-processing instruction, the post-processing processor is to:

responsive to determining that the kind value indicates a compaction mode, read, based on a first memory address stored in a first local register, a number of data values from the internal memory, wherein the column value specifies the number;

group, based on the column value, the number of data values into a plurality of groups;

compact, based on the kind value, each of the plurality of groups into one of a maximum value of the group or a first element of the group;

determine the maximum value among compacted values and a value stored in a stage register;

store the maximum value in the state register;

apply an activation function to the maximum value, wherein the activation function is one of an identity function, a step function, a sigmoid function, or a hyperbolic tangent function; and write, based on a second memory address stored in a second local register, a result of the activation function to the internal memory; and responsive to determining that the kind value indicates a top-N mode, read, based on a third memory address stored in a third local register, an array of data values;

determine top-N values and their corresponding positions in the array, wherein N is an integer greater than 1;

responsive to determining that a control value indicates a memory write, write the top-N values and their corresponding positions in the internal memory at a fourth memory address stored in a fourth local register; and responsive to determining that the control value indicates a register write, write the top-N values and their corresponding positions in state registers associated with the post-processing processor.

7. The system of claim 1, wherein at least two of the input circuit block, the filter circuit block, the post-processing circuit block, and the output circuit block are to operate concurrently.

8. The system of claim 1, wherein the first instructions comprise an input instruction comprising a type value, a mode value, and a size value, and wherein to execute the input instruction, the input processor is to:

concatenate values of a first local register and a second local register of the input processor to form a first memory address;

read, based on the first memory address, the memory communicatively coupled to the processor to retrieve the data values in a format determined by the type value, wherein the size value determines a number of bytes associated with the data values retrieved from the memory communicatively coupled to the processor; and write the data values to a local memory in a mode determined by the mode value.

9. The system of claim 8, wherein:

responsive to determining that the mode value indicates a first mode, the input processor is to write, based on a second memory address stored in a third local register, to the local memory; and responsive to determining that the mode value indicates a second mode, the input processor is to write in a slice in each of a plurality of circuit stripes with an offset stored in the third local register.

10. The system of claim 1, wherein the fourth instructions comprise an output instruction comprising a type value, a mode value, and a size value, and wherein to execute the output instruction, the output processor is to:

read a plurality of data values from the internal memory based on a first memory address stored in a first local register of the output processor, wherein the size value specifies a number of the plurality of data values;

concatenate values of a second local register and a third local register of the output processor to form a second memory address; and write the plurality of data values to the memory communicatively coupled to the processor based on the second memory address in a format determined by the type value.

11. An accelerator circuit, comprising:

an input circuit block comprising an input processor to perform a first task of a neural network application;

a filter circuit block comprising a filter processor to perform a second task of the neural network application;

a post-processing circuit block comprising a post-processing processor to perform a third task of the neural network application;

an output circuit block comprising an output processor to perform a fourth task of the neural network application; and a plurality of general-purpose registers communicatively coupled to the input circuit block and the filter circuit block, wherein a producer stage is to supply data values to a consumer stage, and wherein operation of the consumer stage is on hold until a start flag stored in a first general-purpose register of the plurality of general-purpose registers is set by the producer stage, wherein the input circuit block, the filter circuit block, the post-processing circuit block, and the output circuit block form an execution pipeline, wherein the input circuit block further comprises a first instruction memory, a first data memory, and a first program counter (PC), wherein the first instruction memory is to store first instructions of the first task specified according to a first instruction set architecture (ISA) of the input processor, wherein the first PC is to store an address of a current first instruction to be executed by a first processor, and wherein the input processor is to execute the first instructions using first data stored in the first data memory to perform the first task, wherein the filter circuit block further comprises a second instruction memory, a second data memory, and a second PC, wherein the second instruction memory is to store second instructions of the second task specified according to a second ISA of the filter processor, wherein the second PC is to store an address of a current second instruction to be executed by a second processor, and wherein the filter processor is to execute the second instructions using second data stored in the second data memory to perform the second task, wherein the post-processing circuit block further comprises a third instruction memory, a third data memory, and a third PC, wherein the third instruction memory is to store third instructions of the third task specified according to a third ISA of the post-processing processor, wherein the third PC is to store an address of a current third instruction to be executed by a third processor, and wherein the post-processing processor is to execute the third instructions using third data stored in the third data memory to perform the third task, and wherein the output circuit block further comprises a fourth instruction memory, a fourth data memory, and a fourth PC, wherein the fourth instruction memory is to store fourth instructions of the fourth task specified according to a fourth ISA of the output processor, wherein the fourth PC is to store an address of a current fourth instruction to be executed by a fourth processor, and wherein the output processor is to execute the fourth instructions using fourth data stored in the fourth data memory to perform the fourth task.

12. The accelerator circuit of 11, wherein the producer stage is the input circuit block, and the consumer stage is one of the filter circuit block, the post-processing circuit block, and the output circuit block, wherein the producer stage is one of the input circuit block and the filter circuit block, and the consumer stage is one of the post-processing circuit block and the output circuit block, or wherein the producer stage is one of the input circuit block, the filter circuit block, and the post-processing circuit block, and the consumer stage is the output circuit block.

13. The accelerator circuit of claim 11, further comprising:

a plurality of shadow registers to store content to be copied to the plurality of general-purpose registers responsive to a copy event; and an interface circuit comprising:

a control register to store a plurality of interrupts to the processor communicatively coupled to the memory, an error register to store a plurality of error flags indicating occurrences of different kinds of errors, a next register to store a mask for selecting the content of the plurality of shadow registers to be copied to the plurality of general-purpose registers, and a quality-of-service register to store controls to the memory communicatively coupled to the processor.

14. The accelerator circuit of claim 11, wherein the input processor of the input circuit block is to read from the memory communicatively coupled to the processor and to write a first result generated by the input circuit block to an internal memory, the filter processor is to read the first result from the internal memory and to write a second result generated by the filter circuit block to the internal memory, the post-processing processor is to read the second result from the internal memory and to write a third result generated by the post-processing circuit block to the internal memory, and the output processor is to read the third result from the internal memory and to write a fourth result generated by the output circuit block to the memory communicatively coupled to the processor.

15. The accelerator circuit of claim 11, wherein at least two of the input circuit block, the filter circuit block, the post-processing circuit block, and the output circuit block are to operate concurrently.

16. The accelerator circuit of claim 11, wherein the first instructions comprise an input instruction comprising a type value, a mode value, and a size value, and wherein to execute the input instruction, the input processor is to:

concatenate values of a first local register and a second local register of the input processor to form a first memory address;

read, based on the first memory address, the memory communicatively coupled to the processor to retrieve the data values in a format determined by the type value, wherein the size value determines a number of bytes associated with the data values retrieved from the memory communicatively coupled to the processor; and write the data values to a local memory in a mode determined by the mode value.

\* \* \* \* \*